US011589385B2

(12) United States Patent
Akkarakaran et al.

(10) Patent No.: US 11,589,385 B2
(45) Date of Patent: *Feb. 21, 2023

(54) DOWNLINK CONTROL INFORMATION RESPONSE TO IDLE MODE REQUESTS

(71) Applicant: QUALCOMM INCORPORATED, San Diego, CA (US)

(72) Inventors: Sony Akkarakaran, San Diego, CA (US); Tao Luo, San Diego, CA (US); Keiichi Kubota, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/454,730

(22) Filed: Nov. 12, 2021

(65) Prior Publication Data

US 2022/0078842 A1 Mar. 10, 2022

Related U.S. Application Data

(63) Continuation of application No. 16/516,164, filed on Jul. 18, 2019, now Pat. No. 11,202,311.
(Continued)

(51) Int. Cl.
*H04W 74/00* (2009.01)
*H04W 74/08* (2009.01)
(Continued)

(52) U.S. Cl.
CPC ......... *H04W 74/006* (2013.01); *H04L 1/0061* (2013.01); *H04W 48/12* (2013.01);
(Continued)

(58) Field of Classification Search
CPC ........... H04W 74/006; H04W 74/0833; H04W 72/042; H04W 48/12; H04W 56/0005;
(Continued)

(56) References Cited

U.S. PATENT DOCUMENTS 10,693,592 B2  6/2020  Ko et al.
10,736,147 B2  8/2020  Jung et al.
(Continued)

FOREIGN PATENT DOCUMENTS

WO   WO-2017026928 A1   2/2017
WO   WO-2017197063 A1   11/2017

OTHER PUBLICATIONS

Ericsson: "Remaining Details on RACH Procedure", 3GPP Draft, 3GPP TSG RAN WG1 Meeting #91, R1-1720941_Remaining Details on RACH Procedure, 3rd Generation Partnership Project (3GPP), Mobile Competence Centre, 650, Route Des Lucioles, F-06921 Sophia-Antipolis Cedex, France, vol. RAN WG1, No. Reno, Nevada, US, Nov. 27, 2017-Dec. 1, 2017, Nov. 18, 2017, XP051370315, 24 pages, Retrieved from the Internet: URL: http://www.3gpp.org/ftp/tsg%5Fran/WG1%5FRL1/TSGR1%5F91/Docs/, [retrieved on Nov. 18, 2017], Section 3.2.
(Continued)

*Primary Examiner* — Brian T O Connor
(74) *Attorney, Agent, or Firm* — Holland & Hart LLP

(57) ABSTRACT

Methods, systems, and devices for wireless communications are described. A user equipment (UE) may transmit a request message to a base station while operating in an idle mode. The base station may generate, in response to the request message, a response message including a random access preamble index corresponding to the received request message. In some cases, the base station may determine a radio network temporary identifier (RNTI) based on the random access preamble index and scramble a cyclic redundancy check (CRC) of the response message with the RNTI. In some examples, the random access preamble index may be included in a payload of the response message. The UE may monitor a physical downlink control channel for the
(Continued)

response message to the request message and receive the response message on the physical downlink control channel.

30 Claims, 17 Drawing Sheets

Related U.S. Application Data

(60) Provisional application No. 62/701,426, filed on Jul. 20, 2018.

(51) Int. Cl.
*H04W 72/04* (2009.01)
*H04W 48/12* (2009.01)
*H04L 1/00* (2006.01)
*H04W 52/02* (2009.01)
*H04W 56/00* (2009.01)

(52) U.S. Cl.
CPC ..... *H04W 72/042* (2013.01); *H04W 74/0833* (2013.01); *H04W 52/0216* (2013.01); *H04W 56/001* (2013.01); *H04W 56/0005* (2013.01)

(58) Field of Classification Search
CPC .......... H04W 52/0216; H04W 56/001; H04W 48/14; H04L 1/0061; H04L 5/0053; Y02D 30/70
See application file for complete search history.

(56) References Cited

U.S. PATENT DOCUMENTS

| 11,202,311 B2* | 12/2021 | Akkarakaran | .... H04W 74/0833 |
|---|---|---|---|
| 2016/0165640 A1 | 6/2016 | Yang et al. | |
| 2018/0124822 A1 | 5/2018 | Wang et al. | |
| 2018/0288810 A1 | 10/2018 | Ishii | |
| 2019/0215136 A1 | 7/2019 | Zhou et al. | |
| 2019/0327764 A1 | 10/2019 | Yoo et al. | |
| 2019/0357260 A1 | 11/2019 | Cirik et al. | |
| 2020/0029358 A1 | 1/2020 | Akkarakaran et al. | |
| 2020/0275491 A1 | 8/2020 | Ren et al. | |
| 2020/0288503 A1 | 9/2020 | Sahlin et al. | |
| 2020/0329466 A1 | 10/2020 | Yoo et al. | |
| 2020/0374942 A1 | 11/2020 | Sivavakeesar et al. | |
| 2020/0404712 A1 | 12/2020 | Christoffersson et al. | |
| 2021/0013991 A1 | 1/2021 | Park et al. | |
| 2021/0037576 A1 | 2/2021 | Shao et al. | |
| 2021/0045163 A1 | 2/2021 | Chai et al. | |
| 2021/0100036 A1* | 4/2021 | Kim | .................. H04W 74/0833 |

OTHER PUBLICATIONS

International Preliminary Report on Patentability—PCT/US2019/042551 The International Bureau of WIPO—Geneva, Switzerland, dated Feb. 4, 2021.

International Search Report and Written Opinion—PCT/US2019/042551—ISA/EPO—dated Jan. 2, 2020.

Partial International Search Report—PCT/US2019/042551—ISA/EPO—dated Oct. 28, 2019.

Samsung: "Corrections on PRACH Procedure", 3GPP Draft; R1-1806705, 3rd Generation Partnership Project (3GPP), Mobile Competence Centre ; 650, Route Des Lucioles; F-06921 Sophia-Antipolis Cedex; France, vol. RAN WG1, No. Busan, Korea; May 21, 2018-May 25, 2018 May 20, 2018, XP051441907, Retrieved from the Internet: URL:http://www.3gpp.org/ftp/Meetings%5F3GPP%5FSYNC/RAN1/Docs/ [retrieved on May 20, 2018], Sections 2.2.2, 2.1, 8 pages.

* cited by examiner

DOWNLINK CONTROL INFORMATION RESPONSE TO IDLE MODE REQUESTS

CROSS REFERENCE

The present Application for Patent is a Continuation of U.S. patent application Ser. No. 16/516,164 by AKKARAKARAN et al., entitled "DOWNLINK CONTROL INFORMATION RESPONSE TO IDLE MODE REQUESTS" filed Jul. 18, 2019, which claims the benefit of U.S. Provisional Patent Application No. 62/701,426 by AKKARAKARN et al., entitled "DOWNLINK CONTROL INFORMATION RESPONSE TO IDLE MODE REQUESTS," filed Jul. 20, 2018, assigned to the assignee hereof, and expressly incorporated herein by reference.

FIELD OF TECHNOLOGY

The following relates generally to wireless communications, and more specifically to downlink control information response to idle mode requests.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A UE may lose system information while operating in an idle mode. The system information may be used to communicate with a serving base station. Conventional techniques for providing system information to the UE are deficient.

SUMMARY

A user equipment (UE) operating in an idle mode may transmit a request for system information to the base station. The request message may include a preamble, such as a physical random access channel (PRACH) preamble, associated with the system information being requested. The base station may receive the request message and generate a response message (e.g., a random access response). The response message may include a random access preamble identifier (RAPID) or random access preamble index, which indicates the preamble used by the UE to request system information. The UE may receive the response message, determine the RAPID corresponds to the preamble included in the request message, and determine it is the correct recipient for the response message. Then, from the response message, the UE may identify timing or frequency information for when the requested system information will be transmitted by the base station.

In some other wireless communications system, a base station may transmit a physical downlink control channel (PDCCH) signal to schedule resources for a physical downlink shared channel (PDSCH) signal and transmit the preamble index in the PDSCH signal. However, allocating resources for a PDSCH signal just to transmit the preamble index may be an inefficient use of resources, as the preamble index may only be a few bits. Instead, the base station may include a random access response payload in the PDCCH signal. Thus, the base station may transmit the response message using just the PDCCH signal, and the base station may not schedule a PDSCH message as part of the response message. For example, the base station may transmit the response message using just a PDCCH message, and not a PDSCH message if the base station has just one random access response to transmit. Techniques for transmitting a response to an idle-mode request using a PDCCH and without using a PDSCH are described herein.

A method of wireless communications is described. The method may include transmitting a request message to a base station while operating in an idle mode, monitoring a physical downlink control channel for a response message including a random access preamble index associated with the request message, and receiving the response message on the physical downlink control channel.

An apparatus for wireless communications is described. The apparatus may include a processor, memory in electronic communication with the processor, and instructions stored in the memory. The instructions may be executable by the processor to cause the apparatus to transmit a request message to a base station while operating in an idle mode, monitor a physical downlink control channel for a response message including a random access preamble index associated with the request message, and receive the response message on the physical downlink control channel.

Another apparatus for wireless communications is described. The apparatus may include means for transmitting a request message to a base station while operating in an idle mode, monitoring a physical downlink control channel for a response message including a random access preamble index associated with the request message, and receiving the response message on the physical downlink control channel.

A non-transitory computer-readable medium storing code for wireless communications is described. The code may include instructions executable by a processor to transmit a request message to a base station while operating in an idle mode, monitor a physical downlink control channel for a response message including a random access preamble index associated with the request message, and receive the response message on the physical downlink control channel.

Some examples of the method, apparatuses, and non-transitory computer-readable medium described herein may further include operations, features, means, or instructions for determining a radio network temporary identifier (RNTI) based on the random access preamble index and unscrambling a CRC of the response message with the RNTI.

Some examples of the method, apparatuses, and non-transitory computer-readable medium described herein may further include operations, features, means, or instructions for identifying a bit field pattern indicating a RNTI for the response message may be calculated based on the random access preamble index.

Some examples of the method, apparatuses, and non-transitory computer-readable medium described herein may further include operations, features, means, or instructions for identifying a first subset of bits of the random access preamble index in a RNTI and identifying a second subset of bits of the random access preamble index in a payload of the response message.

Some examples of the method, apparatuses, and non-transitory computer-readable medium described herein may further include operations, features, means, or instructions for identifying the random access preamble index in a payload of the response message.

Some examples of the method, apparatuses, and non-transitory computer-readable medium described herein may further include operations, features, means, or instructions for identifying a payload of the response message based on a value of a frequency assignment bit field of the response message.

In some examples of the method, apparatuses, and non-transitory computer-readable medium described herein, the payload may be further identified based on one or more reserved bits of the response message.

In some examples of the method, apparatuses, and non-transitory computer-readable medium described herein, the received response message may be an acknowledgment of the request message.

In some examples of the method, apparatuses, and non-transitory computer-readable medium described herein, the received response message includes information in response to the request message.

In some examples of the method, apparatuses, and non-transitory computer-readable medium described herein, the request message may be a system information request and the information in response to the request message includes timing or frequency information related to when a requested system information will be transmitted.

In some examples of the method, apparatuses, and non-transitory computer-readable medium described herein, the request message may be a positioning reference signal (PRS) request, and the information in response to the request message includes a configuration for a PRS to be transmitted in response to the request.

Some examples of the method, apparatuses, and non-transitory computer-readable medium described herein may further include operations, features, means, or instructions for monitoring for the received response message on the physical downlink control channel based on the response message including a single random access response.

In some examples of the method, apparatuses, and non-transitory computer-readable medium described herein, a type of the generated response message may be indicated by a type-identifying field in a RNTI.

A method of wireless communications is described. The method may include receiving a request message from a UE operating in an idle mode, generating a response message including a random access preamble index corresponding to the received request message, and transmitting the generated response message on a physical downlink control channel.

An apparatus for wireless communications is described. The apparatus may include a processor, memory in electronic communication with the processor, and instructions stored in the memory. The instructions may be executable by the processor to cause the apparatus to receive a request message from a UE operating in an idle mode, generate a response message including a random access preamble index corresponding to the received request message, and transmit the generated response message on a physical downlink control channel.

Another apparatus for wireless communications is described. The apparatus may include means for receiving a request message from a UE operating in an idle mode, generating a response message including a random access preamble index corresponding to the received request message, and transmitting the generated response message on a physical downlink control channel.

A non-transitory computer-readable medium storing code for wireless communications is described. The code may include instructions executable by a processor to receive a request message from a UE operating in an idle mode, generate a response message including a random access preamble index corresponding to the received request message, and transmit the generated response message on a physical downlink control channel.

Some examples of the method, apparatuses, and non-transitory computer-readable medium described herein may further include operations, features, means, or instructions for determining a RNTI based on the random access preamble index and scrambling a CRC of the generated response message with the determined RNTI.

Some examples of the method, apparatuses, and non-transitory computer-readable medium described herein may further include operations, features, means, or instructions for setting a bit field pattern of the generated response message indicating a RNTI may be calculated based on the random access preamble index.

Some examples of the method, apparatuses, and non-transitory computer-readable medium described herein may further include operations, features, means, or instructions for including a first subset of bits of the random access preamble index in a RNTI and including a second subset of bits of the random access preamble index in a payload of the generated response message.

Some examples of the method, apparatuses, and non-transitory computer-readable medium described herein may further include operations, features, means, or instructions for determining a payload for the generated response message including the random access preamble index.

Some examples of the method, apparatuses, and non-transitory computer-readable medium described herein may further include operations, features, means, or instructions for indicating a payload for the generated response message includes the random access preamble index based on a value of a frequency assignment bit field.

Some examples of the method, apparatuses, and non-transitory computer-readable medium described herein may further include operations, features, means, or instructions for indicating the payload includes the random access preamble index may be further based on one or more reserved bits of the generated response message.

In some examples of the method, apparatuses, and non-transitory computer-readable medium described herein, the generated response message may be an acknowledgment of the request message.

In some examples of the method, apparatuses, and non-transitory computer-readable medium described herein, the generated response message includes information in response to the request message.

In some examples of the method, apparatuses, and non-transitory computer-readable medium described herein, the request message may be a system information request and the information in response to the request message includes timing or frequency information related to when a requested system information will be transmitted.

In some examples of the method, apparatuses, and non-transitory computer-readable medium described herein, the request message may be a PRS request, and the information in response to the request message includes a configuration for a PRS to be transmitted in response to the request.

Some examples of the method, apparatuses, and non-transitory computer-readable medium described herein may further include operations, features, means, or instructions for identifying a single random access response for the response message, where the generated response message may be transmitted on the physical downlink control channel based on the identifying.

In some examples of the method, apparatuses, and non-transitory computer-readable medium described herein, a type of the generated response message may be indicated by a type-identifying field in a RNTI.

DETAILED DESCRIPTION

Figure 1:
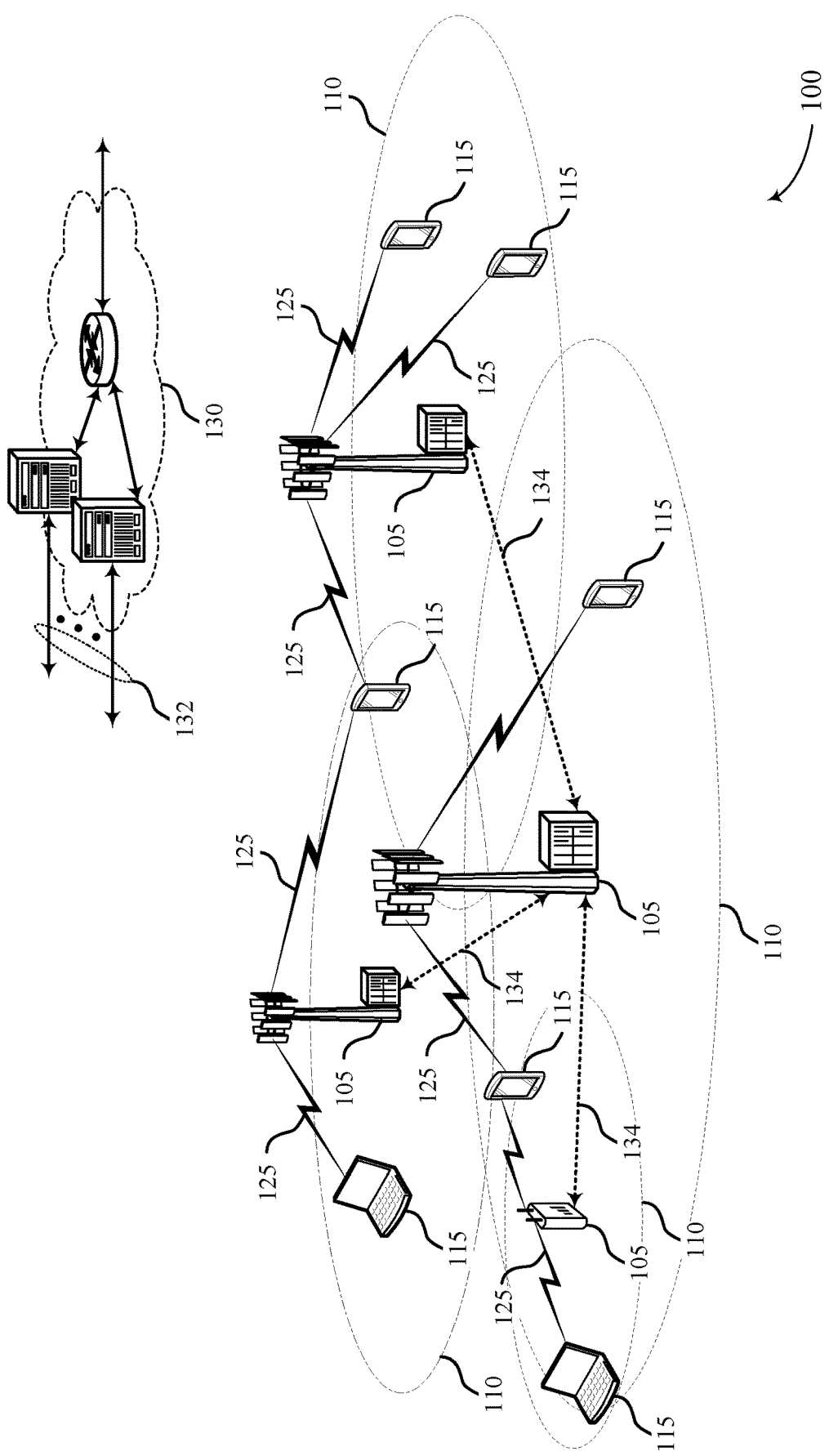
FIG. 1 illustrates an example of a system for wireless communications in accordance with aspects of the present disclosure.

A user equipment (UE) may operate in an idle mode to conserve power usage. However, while operating in idle mode, the UE may lose some configurations for wireless communications, or the configurations may change while the UE is in idle mode. For example, the UE may lose the system information, or the system information may have been updated while the UE was in idle mode. The UE may wake up and monitor for a synchronization signal block (SSB) which is periodically transmitted by a base station. The UE may receive a physical random access channel (PRACH) configuration and a configuration for transmitting a request for system information. This may allow the network to reduce or turn off the periodic broadcast of system information and instead send it only upon request, improving system resource utilization.

The UE may transmit a request message for system information to the base station. The request message may include a preamble, such as a PRACH preamble, associated with the system information being requested. The UE may identify PRACH sequences to use in the request message based on the PRACH configuration. The base station may receive the request message and generate a response message (e.g., a random access response). The response message may include a random access preamble index (RAPID) which indicates the preamble used by the UE to request system information. The RAPID may correspond to the preamble index used to transmit the request message, where the response message is transmitted in response to the request message. The UE may receive the response message, determine the RAPID corresponds to the preamble included in the request message, and determine it is the correct recipient for the response message. Then, from the response message, the UE may identify timing or frequency information for when the requested system information will be transmitted by the base station.

In some other wireless communications system, a base station may transmit a PDCCH signal which schedules resources for a PDSCH signal. The base station transmits the preamble index in the PDSCH signal. However, allocating resources for a PDSCH signal just to transmit the preamble index may be an inefficient use of resources, as the preamble index may only be a few bits.

Instead, the base station may include a random access response payload in the PDCCH signal or PDCCH message. Thus, the base station may transmit the response message using just the PDCCH message, and the base station may not schedule a PDSCH signal as part of the response message. For example, the base station may transmit the response message using just a PDCCH message, and not a PDSCH message, if the base station has just one random access response to transmit. In some examples, such as if there are multiple random access responses to be transmitted, the PDCCH may not have sufficient capacity to accommodate all of them, and the response may be transmitted using a PDCCH that schedules the PDSCH carrying all the responses.

In a first example, the base station may use the RAPID to determine a modified radio network temporary identifier (RNTI). The modified RNTI may be determined based on the resource allocation and preamble of the request message. The base station may scramble a cyclic redundancy check (CRC) of the response message with the modified RNTI. In some cases, the base station may use a bitfield pattern to distinguish the modified RNTI from other (e.g., non-modified) RNTIs. In some cases, the RAPID may not be included in the PDCCH payload. In other examples, a portion of the RAPID may be used to generate the modified RNTI, and a remaining portion of the RAPID may be included in the PDCCH payload. The modified RNTI may be an example of a modified random access RNTI (RA-RNTI).

In a second example, the RAPID may be included in the PDCCH payload. In some cases, the base station may indicate the presence of the RAPID in the PDCCH payload based on a value of a frequency assignment field. The PDCCH message (e.g., the response message) may have a DCI format normally used to schedule a PDSCH. Therefore, if a frequency assignment field is set to a special value, this may be an indication to the UE that the PDCCH message may be used for conveying the RAPID instead of scheduling PDSCH. Additionally, or alternatively, the base station may indicate the RAPID is in the PDCCH payload based on one or more reserved bits More generally, there may be a combination of bitfields with a particular value of bit assignments that are not used or not allowed for existing DCI formats addressed to the same RNTI. There may then be a new DCI format addressed to that RNTI as having those bitfields set to the identified bit assignments, with remaining bits usable to carry additional information required. Thus, the base station 105 may indicate the new DCI format based on a particular value of bit assignments. For example, the additional information may be the RAPID to be acknowledged by the PDCCH, and possibly other information related to the idle mode request corresponding to the transmitted PRACH preamble with that RAPID. When the idle mode request is a System Information (SI) request, the additional information may indicate the time and/or frequency location at which the SI will be transmitted, which may reduce the UE's complexity in monitoring for this SI. The frequency assignment bitfield set to all ones is a particular case of such a bitfield and assignment. For example, the frequency assignment bitfield set to all ones may be used for PDCCH addressed to RA-RNTI. In some cases, the frequency assignment set to all ones may be used in other configurations to indicate downlink DCI for PDCCH-ordered RACH when PDCCH is addressed to a cell-RNTI The techniques described herein may be used for other idle mode requests. For example, the UE and base station may implement similar techniques to handle an idle mode request for a downlink or uplink positioning reference signal (PRS). The PDCCH payload may also include other parameters related to the PRS configuration. By using a modified RNTI, the base station may define a new payload format and use remaining available bits in the PDCCH payload for the configuration information. In some cases, each idle mode request type may be associated with a type ID field in a modified RNTI used to scramble the CRC of the PDCCH transmitted in response to the idle mode request. In other cases, multiple idle mode request responses may be addressed to the same RNTI (for example, the RA-RNTI), and specific bitfields in the PDCCH payload may be used to establish the type of idle mode request being acknowledged. For example, the type of idle mode request may be identified by the RAPID included in the PDCCH payload as described above, and other unused bits in the PDCCH payload may then represent or indicate specific configuration information related to the specific idle mode request.

Aspects of the disclosure are initially described in the context of a wireless communications system. Aspects of the disclosure are further illustrated by and described with reference to apparatus diagrams, system diagrams, and flowcharts that relate to downlink control information response to idle mode requests.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a CRC), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\,T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115, which may be operating in an idle mode, may transmit a request message to a base station 105. For example, the request message may be for system information. The base station 105 may transmit a response message in response to the request message. The base station 105 may include a random access response payload in a PDCCH signal without scheduling a PDSCH signal as part of a response message. In some cases, the base station may use the preamble index corresponding to the request message to determine a modified RNTI. The base station may scramble a CRC of the response message with the modified RNTI. Additionally, or alternatively, the RAPID may be included in the PDCCH payload. In some cases, the base station may indicate the presence of the RAPID in the PDCCH payload based on a value of a frequency assignment field.

Figure 2:
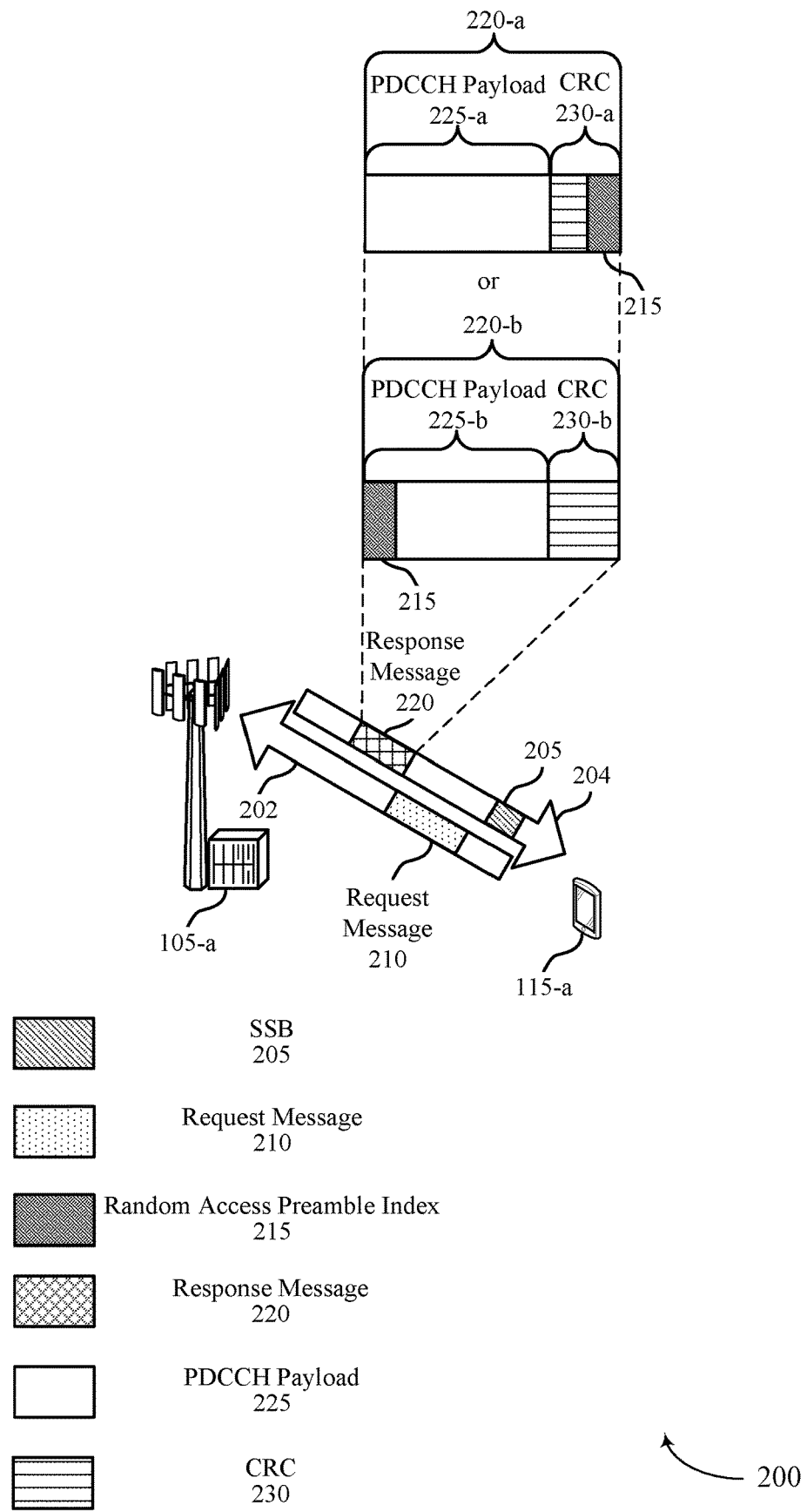
FIG. 2 illustrates an example of a wireless communications system in accordance with aspects of the present disclosure.

FIG. 2 illustrates an example of a wireless communications system 200 in accordance with aspects of the present disclosure. In some examples, wireless communications system 200 may implement aspects of wireless communications system 100. Wireless communications system 200 may include UE 115-*a* and base station 105-*a*. UE 115-*a* may be an example of a UE 115 and base station 105-*a* may be an example of a base station 105 as described herein.

Base station 105-*a* may periodically transmit a synchronization signal block (SSB) 205 which includes some system information in a master information block (MIB). The MIB may be transmitted in a physical broadcast channel (PBCH) in the SSB 205. A UE 115 which wakes up in the cell provided by base station 105-*a* or a UE 115 which performs initial access to base station 105-*a* may use the information in the MIB to receive system information blocks (SIBs) carrying system information. System information may relate basic information for UEs 115 in the wireless communications system 200. There may be multiple different SIB messages transmitted by base station 105-*a*, each of which may include different system information. For example, a first SIB (e.g., SIB1) may include a physical random access channel (PRACH) configuration and scheduling information for subsequent SIBs. The subsequent SIBs may include information related to common channels, re-selection information, etc. Base station 105-*a* may periodically transmit the SIBs, as base station 105-*a* may have to provide the system information to newly served UEs 115 which wake up or arrive (e.g., from neighboring cells) in the cell provided by base station 105-*a*. In some cases, however, base station 105-*a* may stop periodically transmitting some of the SIBs. For example, if little UE mobility is detected, base station 105-*a* may stop transmitting some of the SIBs (e.g., SIBs other than SIB1) to reduce network energy usage and improve spectral efficiency.

UE 115-*a* may operate in an idle mode to conserve power usage. However, while operating in idle mode, UE 115-*a* may lose some configurations for the wireless communications system 200. For example, UE 115-*a* may lose the system information, or the system information may have been updated while UE 115-*a* was in idle mode.

UE 115-*a* may wake up and monitor for the SSB 205, which is periodically transmitted by base station 105-*a*. UE 115-*a* may receive a MIB and attempt to decode a SIB based on information included in the MIB. UE 115-*a* may receive a first SIB (e.g., SIB1) including a PRACH configuration. However, base station 105-*a* may have identified little UE mobility while UE 115-*a* was operating in idle mode, and the other SIBs may not be periodically transmitted. The first SIB may include information related to an availability of an on-demand SI request procedure, which UE 115-*a* may follow if the other SIBs are not periodically transmitted.

UE 115-*a* may transmit a request message 210 to base station 105-*a*. Based on the PRACH configuration in SIB1, UE 115-*a* may identify some PRACH sequences to use in the request message 210 to request other SIBs. The request message may include a preamble, such as a PRACH preamble, associated with the system information being requested. In some cases, the request message 210 may be referred to as "MSG1."

Base station 105-*a* may receive the request message 210 and generate a response message 220 to transmit in response. In some cases, the response message 220 may be an example of a "MSG2" or a random access response. The response message 220 may include a random access preamble identifier (RAPID) 215 which indicates the preamble used by UE 115-*a* to request system information. UE 115-*a* may receive the response message 220, determine the RAPID corresponds to the preamble included in the request message 210, and determine the response message 220 is intended for UE 115-*a*.

In some cases, the response message 220 may include a PDCCH message and a PDSCH message, where the PDCCH message schedules the PDSCH message. The PDSCH message may include a special MAC sub-protocol data unit (PDU), where each sub-PDU includes just a MAC sub-header and a RAPID (not shown). In this example, a PDSCH structure for the PDSCH message in the response message 220 may be the same as a MSG2 in response to an initial access request from a UE 115. The response to initial access request may include timing information, grants, etc., which may occupy resources of the PDSCH message, but the PDSCH message in the response message 220 may just include a MAC sub-header and a RAPID.

In some cases, base station 105-a may receive a request message 210 from multiple UEs 115. If base station 105-a receives a request message 210 from multiple UEs 115, the PDSCH message may include a special MAC sub-PDUs for each of the multiple UEs 115. However, if base station 105-a just receives a request message 210 from one UE 115, base station 105-a may still schedule a PDSCH message, which has a large amount of overhead, just to transmit a single MAC sub-header and a single RAPID. UE 115-a and base station 105-a may instead implement techniques to reduce the overhead for response messages to idle mode requests.

For example, base station 105-a may instead include a random access response payload as downlink control information in a PDCCH message. Thus, if base station 105-a only has one random access response to transmit, base station 105-a may transmit the response message 220 using a PDCCH message, and base station 105-a may not schedule a PDSCH message as part of the response message 220.

In a first example, shown by the response message 220-a, base station 105-a may use the RAPID 215 to determine the RNTI (e.g., a new or modified RNTI). Base station 105-a may scramble a CRC 230-a of response message 220-a with the modified RNTI. Therefore, the RAPID 215 may be included in the CRC 230. As shown, response message 220-a includes PDCCH payload 225-a and CRC 230-a. The RAPID 215 may be included in the CRC 230-a by scrambling the CRC 230-a with a modified RNTI.

In the first example, the modified RNTI may be determined based on a slot index, symbol index, frequency index, carrier ID, and preamble of the PRACH of the corresponding request message 210 and the RAPID 215, or any combination thereof. Therefore, the modified RNTI may be determined based on the resource allocation and preamble index (e.g., the RAPID 215) of the corresponding PRACH message (e.g., MSG1 or the request message 210). In some cases, base station 105-a may use a bitfield pattern to distinguish the modified RNTI from previous, other RA-RNTIs. For example, a modified RNTI may have a different range of values from other RA-RANTIs. If other RA-RNTI values range from, for example, "0000" through "FFEF," a modified RNTI, which may be determined based on the RAPID 215, may have a value range from "FFF0" through "FFFF." Some of values may be reserved for other purposes, for example, FFFF may be used to indicate SI-RNTI and FFFE may be used to indicate P-RNTI. In some implementations, values reserved for other purposes may not be used to indicate a modified RNTI.

In some cases of the first example, the RAPID 215 may not be included in the PDCCH payload 225-a. In some other examples, a portion of the RAPID 215 may be used to generate the modified RNTI and included in the CRC 230-a, and a remaining portion of the RAPID 215 may be included in the PDCCH payload 225-a. For example, if the RAPID 215 is 6 bits long, base station 105-a may use 4 bits of the RAPID 215 to generate the modified RNTI and include the remaining 2 bits of the RAPID 215 in the PDCCH payload 225-a. Other distributions of the RAPID 215 between the modified RNTI and the PDCCH payload 225-a may be used as well. In some cases, by using a modified RNTI, base station 105-a may define a new payload format. In some cases, base station 105-a may include the RAPID 215 (e.g., all bits of the RAPID 215) in both the modified RNTI and the PDCCH payload 225-a.

In a second example, shown by the response message 220-b, the RAPID 215 may be included in the PDCCH payload 225. For example, the RAPID 215 is included in the PDCCH payload 225-b of the response message 220-b. In some cases, of the second example, the CRC 230-b may be scrambled by a conventional RNTI such as RA-RNTI (e.g., not a modified RNTI as described above). The RAPID 215 may correspond to the preamble index used to transmit the request message 210, where the response message 220-b is transmitted in response to the request message 210. Thus, the RAPID 215 may correspond to a preamble which UE 115-a used, and the RAPID 215 may not correspond to an instruction of which preamble index UE 115-a should use (e.g., for a following PRACH message).

In some cases, base station 105-a may indicate the presence of the RAPID 215 in the PDCCH payload 225-b based on a value of a frequency assignment field. The PDCCH message (e.g., the response message 220) may have a DCI format normally used to schedule a PDSCH. Therefore, if a frequency assignment field is set to a special value, this may be an indication to the receiving UE 115 (e.g., UE 115-a) that the PDCCH message may be used for purposes other than to schedule PDSCH. For example, if the frequency assignment field is six bits long and set to "111111" or "111110," it may be an indication that the RAPID 215 is included in the PDCCH payload 225-b. Additionally, or alternatively, base station 105-a may indicate the RAPID 215 is in the PDCCH payload 225-b based on one or more reserved bits. For example, the frequency assignment field may be set to "111111," and a reserved bit may be toggled, which may indicate the RAPID 215 is included in the PDCCH payload 225-b.

In some cases, multiple base stations 105 may coordinate, such that each base station 105 transmits a single random access response in cases where multiple request messages 210 are received. For example, if base station 105-a receives two request messages 210, base station 105-a may send one of the request messages to another base station 105. Then, base station 105-a may transmit a response message 220 using just a PDCCH message and the other base station 105 may transmit a response message 220 using just a PDCCH message, and neither base station 105 uses PDSCH resources for transmitting a response message.

The techniques described herein may be used for other idle mode requests. For example, UE 115-a and base station 105-a may implement similar techniques to handle an idle mode request for a downlink or uplink PRS. The PDCCH payload 225 may also include other parameters related to the PRS configuration. By using a modified RNTI, base station 105-a may define a new payload format and use remaining available bits in the PDCCH payload 225 for the PRS configuration. In some cases, each idle mode request type may be associated with a type ID field in a modified RNTI.

Figure 3:
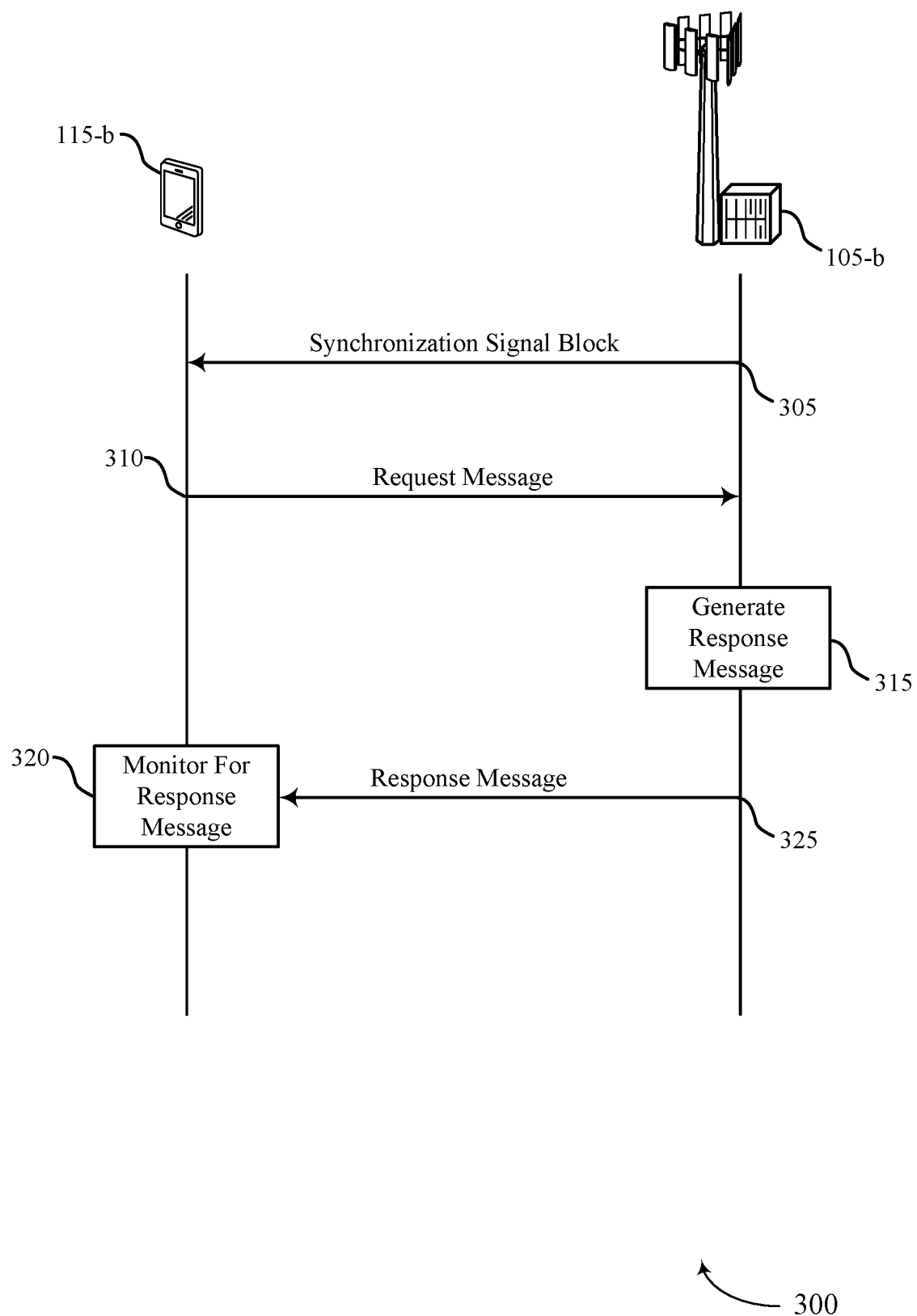
FIG. 3 illustrates an example of a process flow in accordance with aspects of the present disclosure.

FIG. 3 illustrates an example of a process flow 300 in accordance with aspects of the present disclosure. In some examples, process flow 300 may implement aspects of wireless communications system 100. UE 115-b may be an example of a UE 115 and base station 105-*b* may be an example of a base station 105 as described herein.

UE 115-*b* may be in an idle mode. UE 115-*b* may not have up-to-date system information and may scan for an SSB from base station 105-*b*. At 305, base station 105-*b* may transmit the SSB. The SSB may include a MIB, which UE 115-*b* may use to decode a SIB as described in FIG. 2. The SIB may be an example of a SIB1, which includes a PRACH configuration for UE 115-*b*. UE 115-*b* may determine that base station 105-*b* is not periodically transmitting other SIBs based on the information received from the SSB.

At 310, UE 115-*b* may transmit a request message to base station 105-*b* while operating in the idle mode. In some cases, the request message may be a system information request. UE 115-*b* may transmit the request message with a preamble corresponding to requested system information. UE 115-*b* may identify some PRACH preambles based on the information in SIB 1. In some other examples, the request message may be a PRS request. In some cases, the PRS request may be a request for the base station 105-*b* to transmit DL PRS or a request to allow UE 115-*b* to transmit UL PRS.

At 315, base station 105-*b* may generate, in response to the request message, a response message including a random access preamble index corresponding to the received request message. As described in FIG. 2, base station 105-*b* may transmit the response message as downlink control information in a PDCCH signal and not use a PDSCH signal. Therefore, base station 105-*b* may implement techniques to transmit the response message in the PDCCH signal. Base station 105-*b* may also include indications that the response message is conveyed using the PDCCH signal, such that UE 115-*b* may identify the information in the response message.

For example, base station 105-*b* may determine a RNTI based on the random access preamble index and scramble a CRC of the generated response message with the determined RNTI. Base station 105-*b* may set a bit field pattern of the generated response message indicating the RNTI is calculated based on the random access preamble index. In some cases, base station 105-*b* may include a first subset of bits of the random access preamble index in the RNTI and include a second subset of bits of the random access preamble index in a payload of the generated response message. These examples may relate to the first example described in FIG. 2.

In another example, base station 105-*b* may determine a payload for the generated response message including the random access preamble index. In some cases, base station 105-*b* may indicate the payload for the generated response message includes the random access preamble index based on a value of a frequency assignment bit field. For example, base station 105-*b* may set a value of the frequency assignment bit field such that UE 115-*b* can determine that the PDCCH signal carries the random access preamble index and is not used for scheduling a PDSCH. Additionally, or alternatively, the base station may indicate the payload includes the random access preamble index is further based at least in part on one or more reserved bits of the generated response message. These examples may relate to the second example described in FIG. 2.

At 320, UE 115-*b* may monitor a physical downlink control channel for a response message to the request message, the response message including the random access preamble index associated with the request message. At 325, base station 105-*b* may transmit the generated response message on the physical downlink control channel, and UE 115-*b* may receive the response message.

The received response message may be an acknowledgment of the request message. In some cases, the received response message may include information in response to the request message. For example, the request message may be a system information request and the information in response to the request message may include timing or frequency information related to when a requested system information will be transmitted. In some examples, the request message may be a PRS request, and the information in response to the request message may include a configuration for a PRS to be transmitted in response to the request. In some cases, a type of the response message may be indicated by a type-identifying field in the RNTI. In some cases, the response message may include a single random access response.

Figure 4:
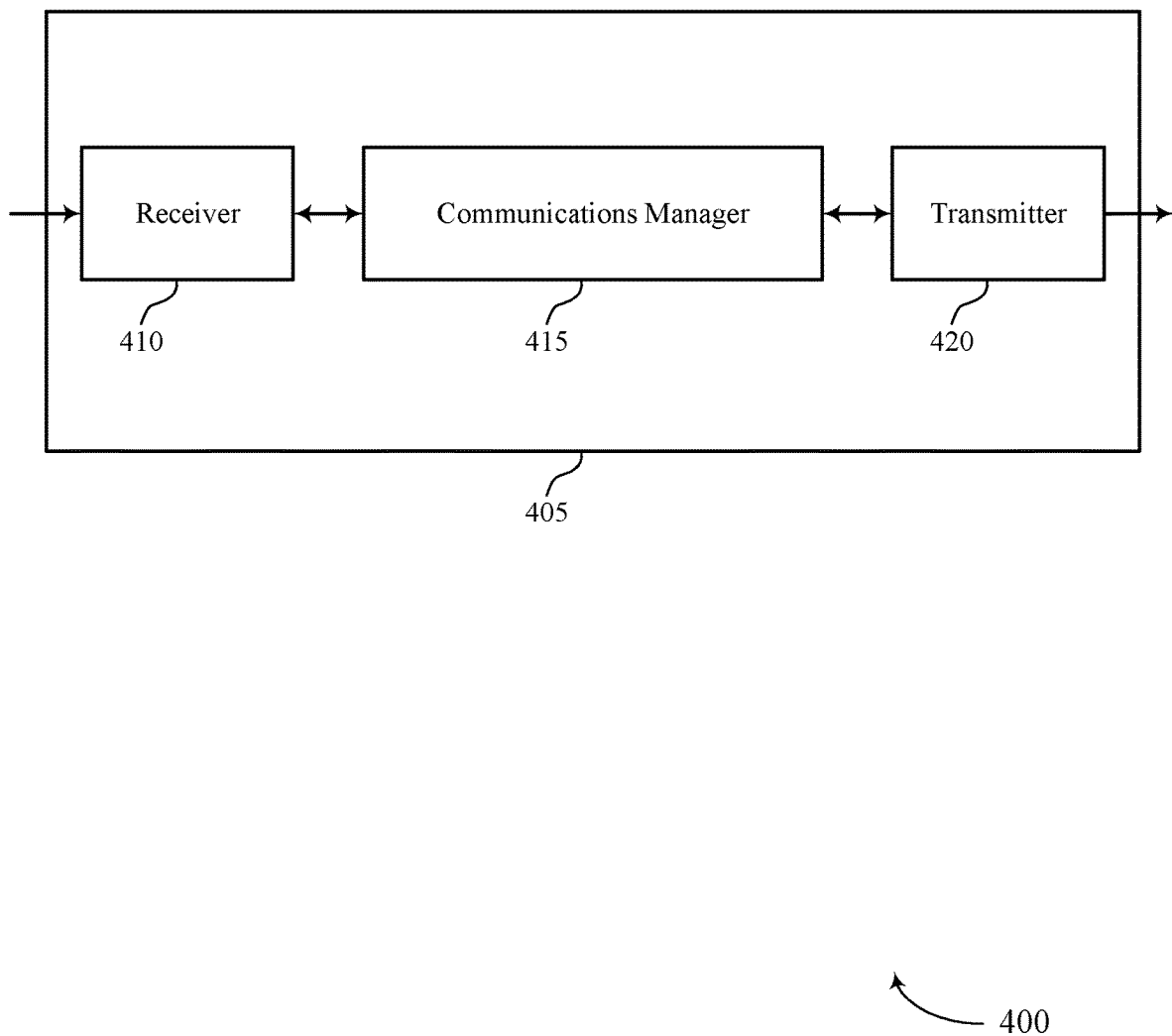
FIGS. 4 and 5 show block diagrams of devices in accordance with aspects of the present disclosure.

FIG. 4 shows a block diagram 400 of a device 405 in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to the present disclosure, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may transmit a request message to a base station while operating in an idle mode, monitor a physical downlink control channel for a response message to the request message, the response message including a random access preamble index associated with the request message, and receive the response message on the physical downlink control channel. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
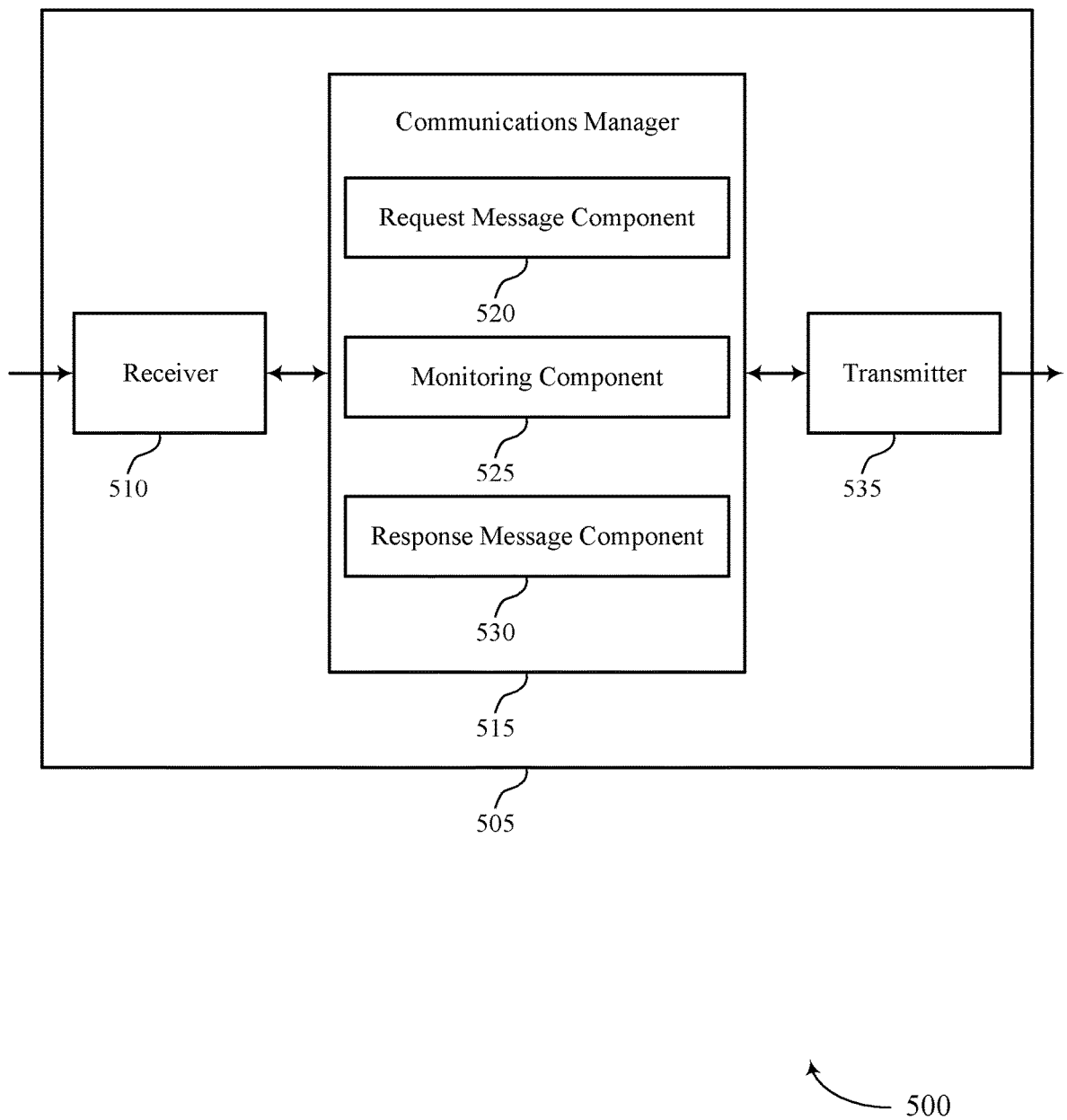

FIG. 5 shows a block diagram 500 of a device 505 in accordance with aspects of the present disclosure. The device 505 may be an example of aspects of a device 405 or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to the present disclosure, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a request message component 520, a monitoring component 525, and a response message component 530. The communications manager 515 may be an example of aspects of the communications manager 710 described herein.

The request message component 520 may transmit a request message to a base station while operating in an idle mode. The monitoring component 525 may monitor a physical downlink control channel for a response message to the request message, the response message including a random access preamble index associated with the request message. The response message component 530 may receive the response message on the physical downlink control channel.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
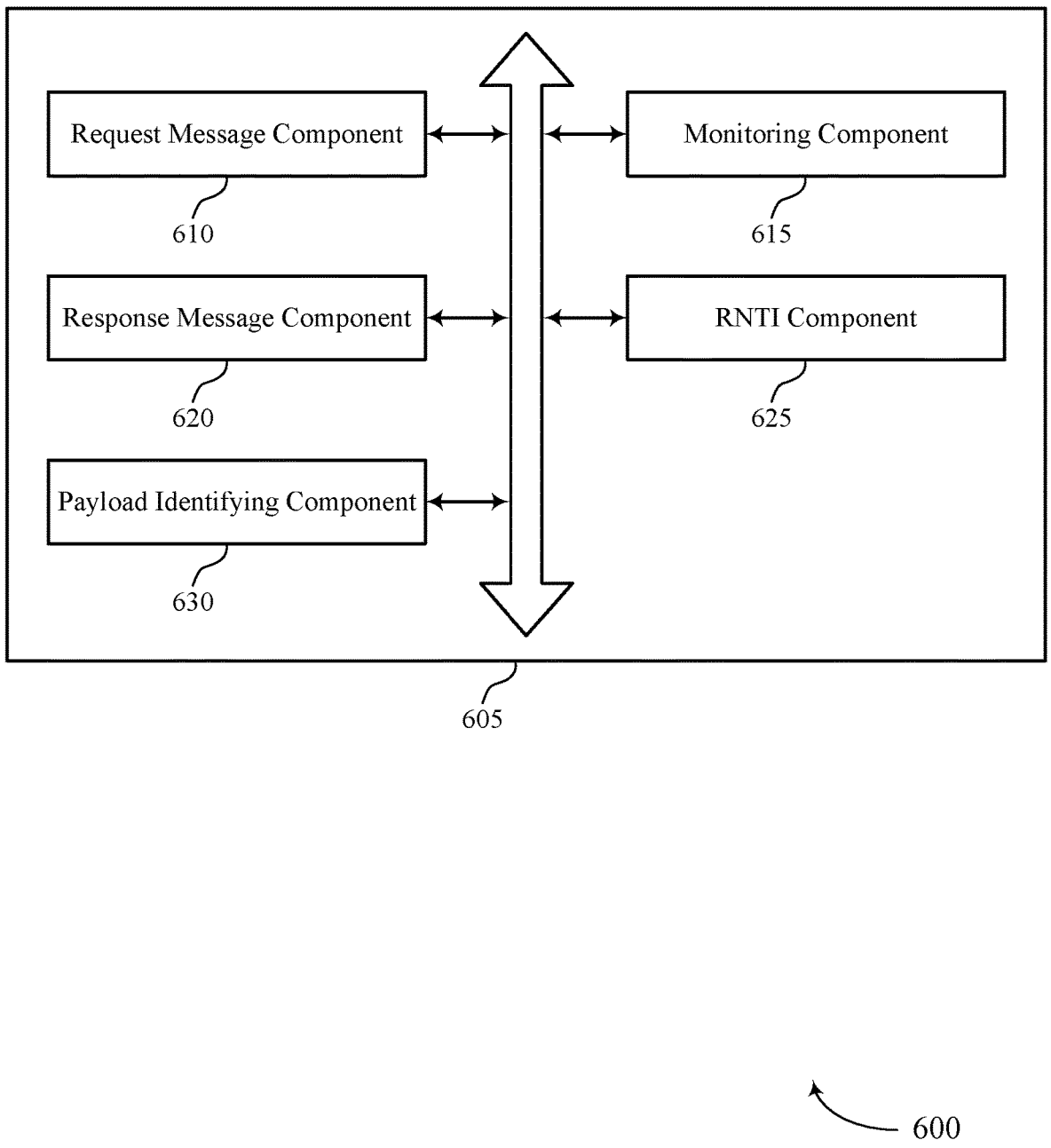
FIG. 6 shows a block diagram of a communications manager in accordance with aspects of the present disclosure.

FIG. 6 shows a block diagram 600 of a communications manager 605 in accordance with aspects of the present disclosure. The communications manager 605 may be an example of aspects of a communications manager 415, a communications manager 515, or a communications manager 710 described herein. The communications manager 605 may include a request message component 610, a monitoring component 615, a response message component 620, a RNTI component 625, and a payload identifying component 630. Each of these modules may communicate, directly or indirectly, with one another (e.g., via one or more buses).

The request message component 610 may transmit a request message to a base station while operating in an idle mode. In some cases, a received response message includes information in response to the request message. In some cases, the request message is a system information request and the information in response to the request message includes timing or frequency information related to when a requested system information will be transmitted. In some cases, the request message is a PRS request, and the information in response to the request message includes a configuration for a PRS to be transmitted in response to the request.

The monitoring component 615 may monitor a physical downlink control channel for a response message to the request message, the response message including a random access preamble index associated with the request message. In some cases, the response message includes a single random access response. In some examples, the monitoring component 615 may monitor for the received response message on the physical downlink control channel based on the response message including a single random access response.

The response message component 620 may receive the response message on the physical downlink control channel. In some cases, the received response message is an acknowledgment of the request message. In some cases, a type of the received response message is indicated by a type-identifying field in an RNTI.

The RNTI component 625 may determine an RNTI based on the random access preamble index. In some examples, the RNTI component 625 may unscramble a CRC of the response message with the RNTI. In some examples, the RNTI component 625 may identify a bit field pattern indicating the RNTI for the response message is calculated based on the random access preamble index.

In some examples, the RNTI component 625 may identify a first subset of bits of the random access preamble index in the RNTI. The payload identifying component 630 may identify a second subset of bits of the random access preamble index in a payload of the response message.

In some examples, the payload identifying component 630 may identify the random access preamble index in a payload of the response message. In some examples, the payload identifying component 630 may identify a payload of the response message based on a value of a frequency assignment bit field of the response message. In some cases, the payload is further identified based on one or more reserved bits of the response message.

Figure 7:
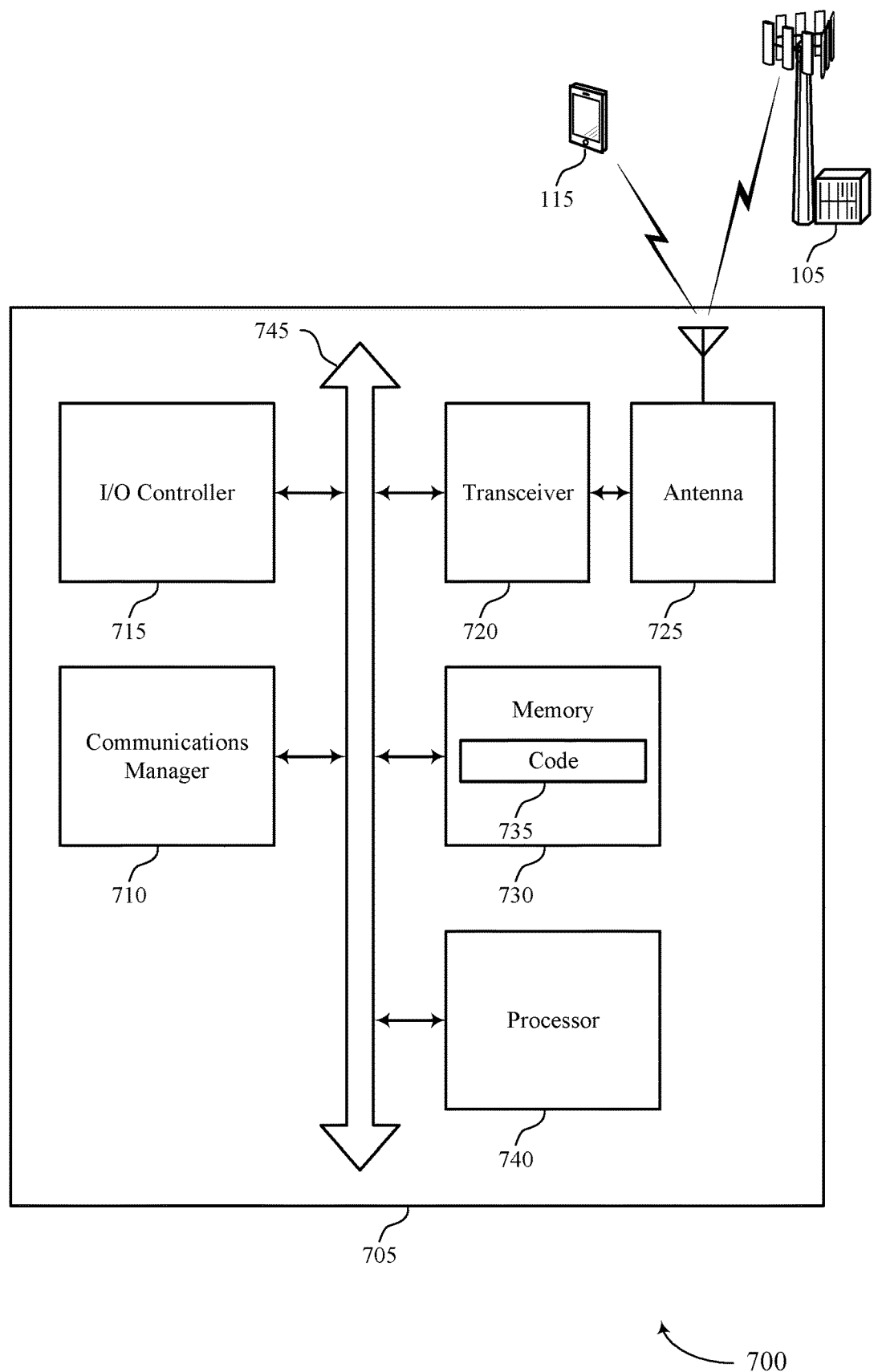
FIG. 7 shows a diagram of a system including a device in accordance with aspects of the present disclosure.

FIG. 7 shows a diagram of a system 700 including a device 705 in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may transmit a request message to a base station while operating in an idle mode, monitor a physical downlink control channel for a response message to the request message, the response message including a random access preamble index associated with the request message, and receive the response message on the physical downlink control channel.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting downlink control information response to idle mode requests).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
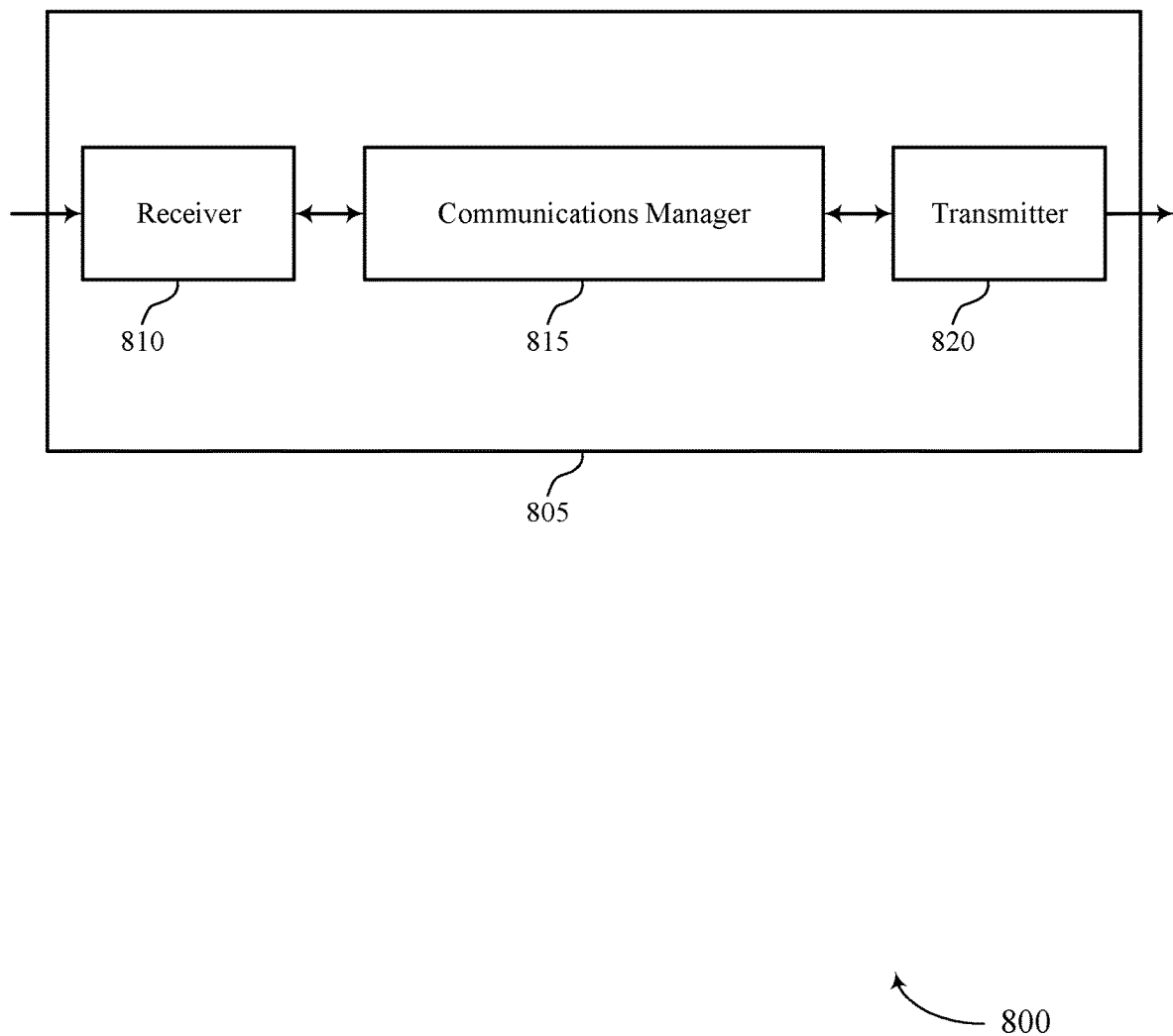
FIGS. 8 and 9 show block diagrams of devices in accordance with aspects of the present disclosure.

FIG. 8 shows a block diagram 800 of a device 805 in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to the present disclosure, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive a request message from a UE operating in an idle mode, generate, in response to the request message, a response message including a random access preamble index corresponding to the received request message, and transmit the generated response message on a physical downlink control channel. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
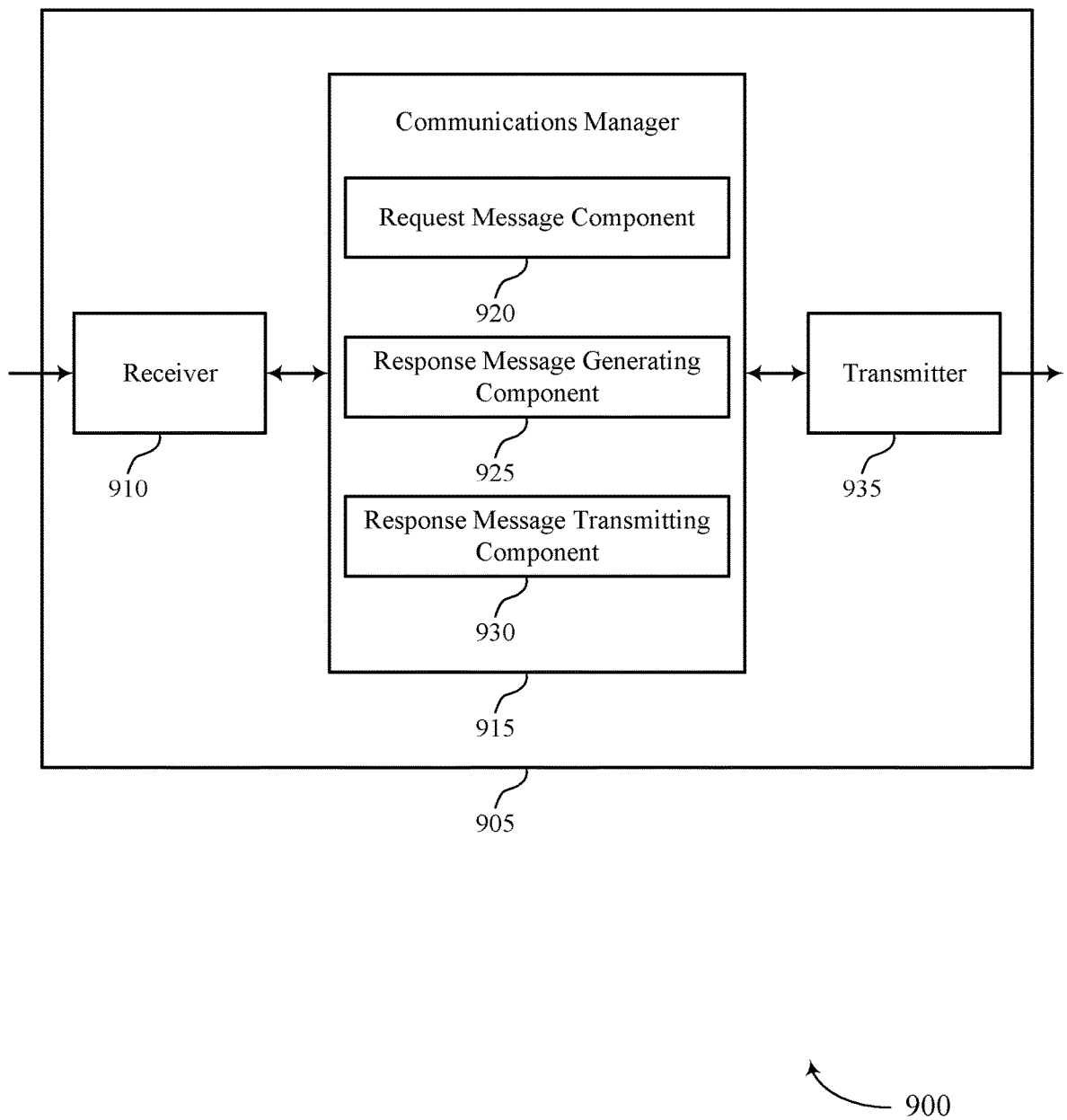

FIG. 9 shows a block diagram 900 of a device 905 in accordance with aspects of the present disclosure. The device 905 may be an example of aspects of a device 805 or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to the present disclosure, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a request message component 920, a response message generating component 925, and a response message transmitting component 930. The communications manager 915 may be an example of aspects of the communications manager 1110 described herein.

The request message component 920 may receive a request message from a UE operating in an idle mode. The response message generating component 925 may generate, in response to the request message, a response message including a random access preamble index corresponding to the received request message. The response message transmitting component 930 may transmit the generated response message on a physical downlink control channel.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
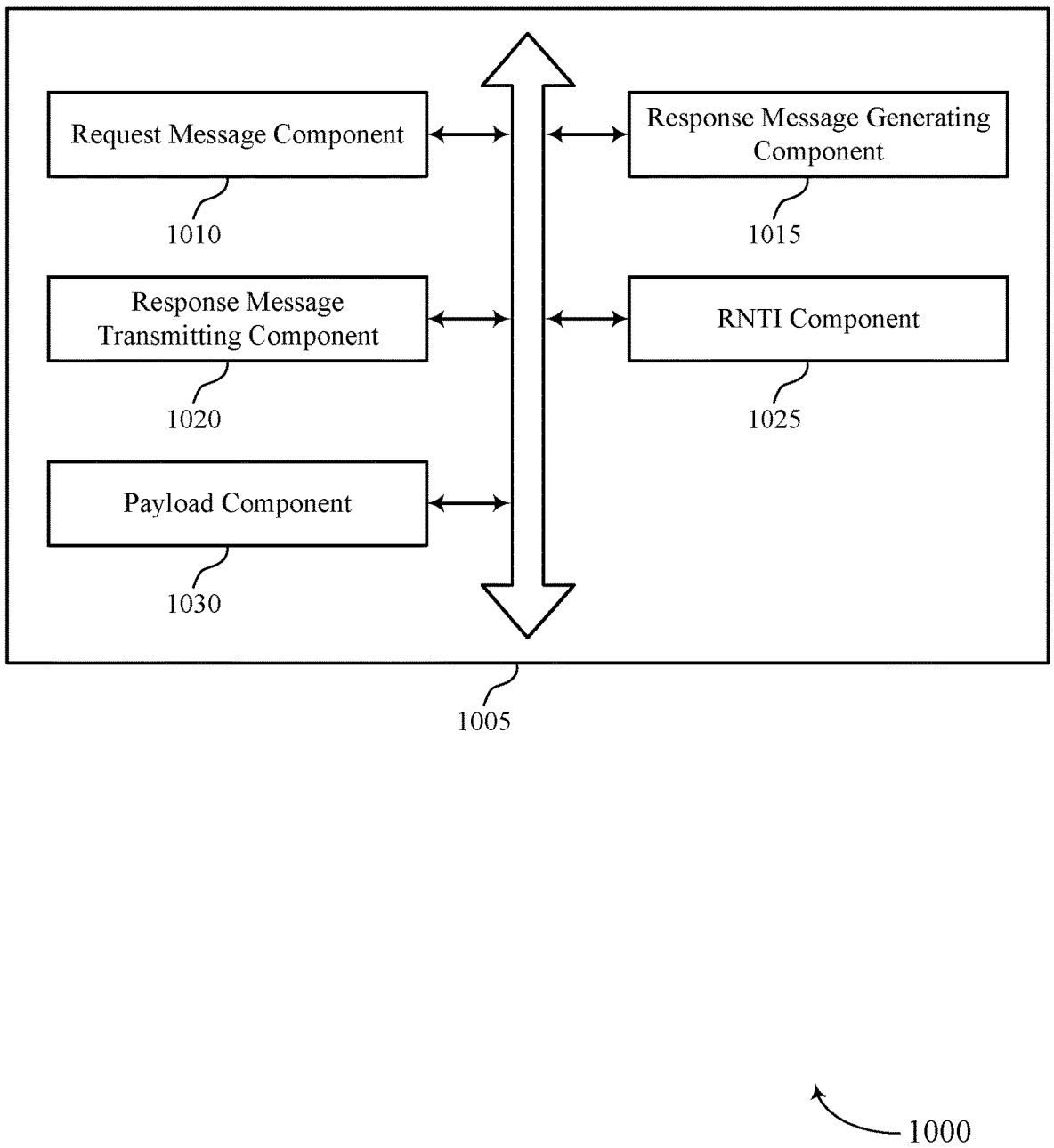
FIG. 10 shows a block diagram of a communications manager in accordance with aspects of the present disclosure.

FIG. 10 shows a block diagram 1000 of a communications manager 1005 in accordance with aspects of the present disclosure. The communications manager 1005 may be an example of aspects of a communications manager 815, a communications manager 915, or a communications manager 1110 described herein. The communications manager 1005 may include a request message component 1010, a response message generating component 1015, a response message transmitting component 1020, a RNTI component 1025, and a payload component 1030. Each of these modules may communicate, directly or indirectly, with one another (e.g., via one or more buses).

The request message component 1010 may receive a request message from a UE operating in an idle mode. In some cases, a generated response message includes information in response to the request message. In some cases, the request message is a system information request and the information in response to the request message includes timing or frequency information related to when a requested system information will be transmitted. In some cases, the request message is a PRS request, and the information in response to the request message includes a configuration for a PRS to be transmitted in response to the request.

The response message generating component 1015 may generate, in response to the request message, a response message including a random access preamble index corresponding to the received request message. In some cases, the generated response message is an acknowledgment of the request message. In some cases, a type of the generated response message is indicated by a type-identifying field in the RNTI.

The response message transmitting component 1020 may transmit the generated response message on a physical downlink control channel. In some examples, the response message transmitting component 1020 may identify a single random access response for the response message, where the generated response message is transmitted on the physical downlink control channel based on the identifying.

The RNTI component 1025 may determine the RNTI based on the random access preamble index. In some examples, the RNTI component 1025 may scramble a CRC of the generated response message with the determined RNTI. In some examples, the RNTI component 1025 may set a bit field pattern of the generated response message indicating the RNTI is calculated based on the random access preamble index.

In some examples, the RNTI component 1025 may include a first subset of bits of the random access preamble index in the RNTI. The payload component 1030 may include a second subset of bits of the random access preamble index in a payload of the generated response message.

In some examples, the payload component 1030 may determine a payload for the generated response message including the random access preamble index. In some examples, indicating a payload for the generated response message includes the random access preamble index based on a value of a frequency assignment bit field. In some examples, indicating the payload includes the random access preamble index is further based on one or more reserved bits of the generated response message.

Figure 11:
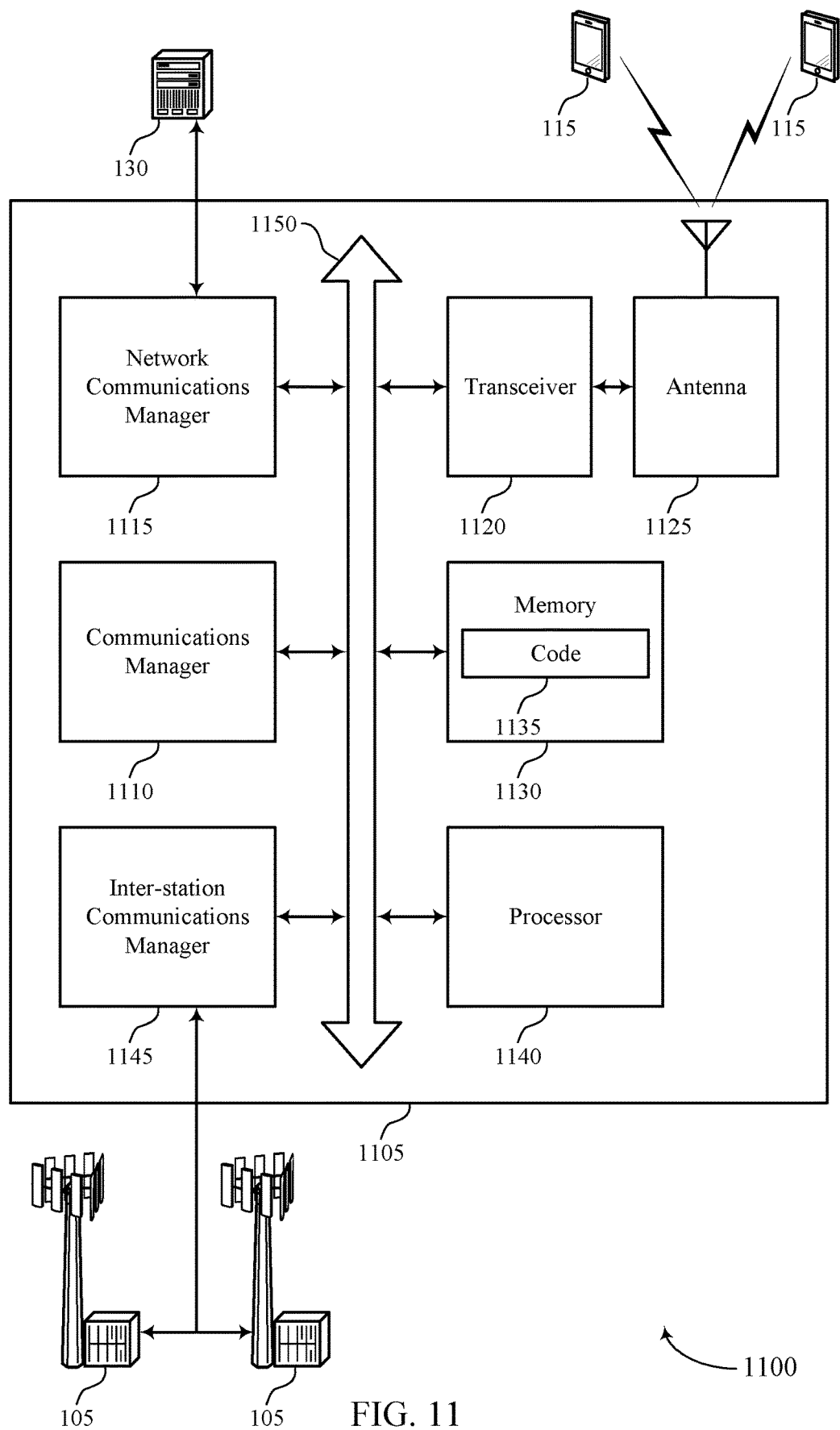
FIG. 11 shows a diagram of a system including a device in accordance with aspects of the present disclosure.

FIG. 11 shows a diagram of a system 1100 including a device 1105 in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may receive a request message from a UE operating in an idle mode, generate, in response to the request message, a response message including a random access preamble index corresponding to the received request message, and transmit the generated response message on a physical downlink control channel.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting downlink control information response to idle mode requests).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
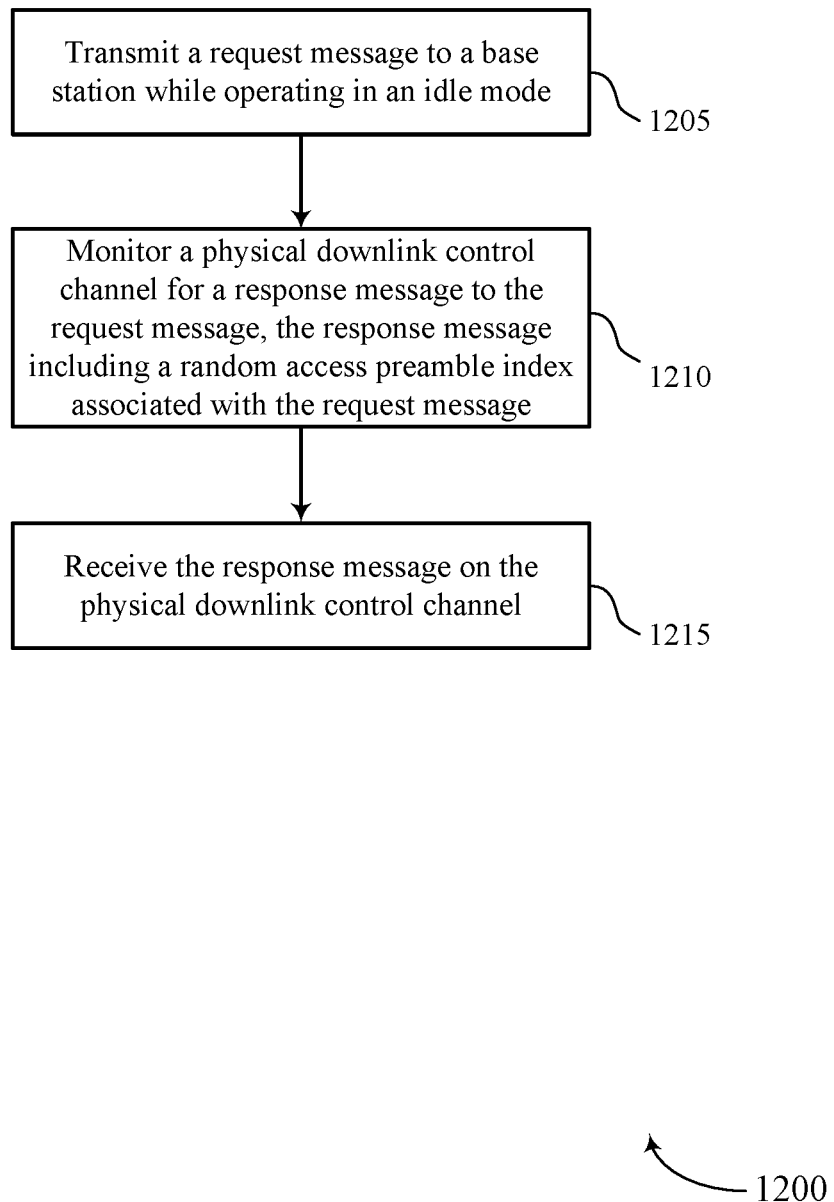
FIGS. 12 through 17 show flowcharts illustrating methods in accordance with aspects of the present disclosure.

FIG. 12 shows a flowchart illustrating a method 1200 in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may transmit a request message to a base station while operating in an idle mode. The operations of 1205 may be performed according to the methods described herein. In some examples, aspects of the operations of 1205 may be performed by a request message component as described with reference to FIGS. 4 through 7.

At 1210, the UE may monitor a physical downlink control channel for a response message to the request message, the response message including a random access preamble index associated with the request message. The operations of 1210 may be performed according to the methods described herein. In some examples, aspects of the operations of 1210 may be performed by a monitoring component as described with reference to FIGS. 4 through 7.

At 1215, the UE may receive the response message on the physical downlink control channel. The operations of 1215 may be performed according to the methods described herein. In some examples, aspects of the operations of 1215 may be performed by a response message component as described with reference to FIGS. 4 through 7.

Figure 13:
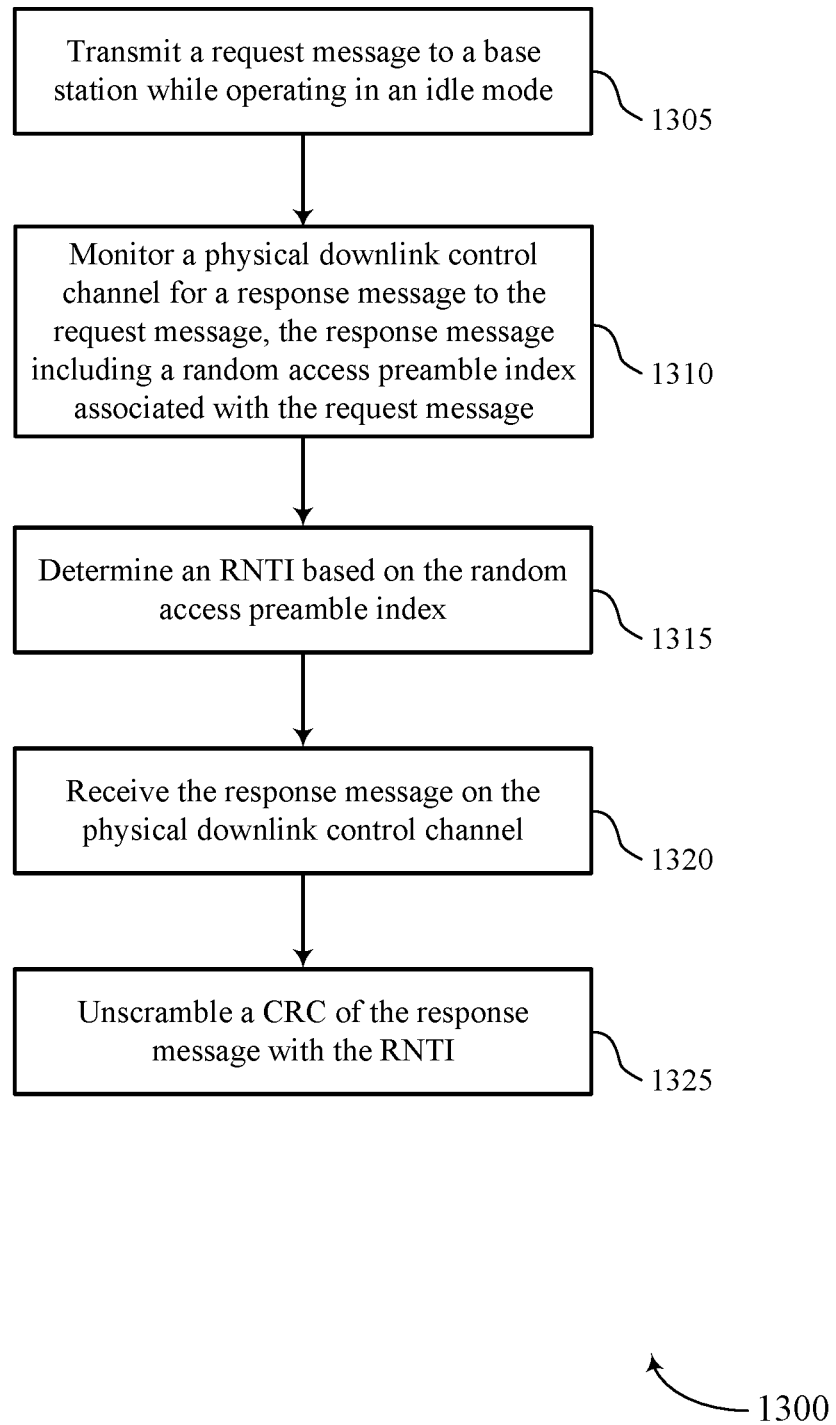

FIG. 13 shows a flowchart illustrating a method 1300 in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may transmit a request message to a base station while operating in an idle mode. The operations of 1305 may be performed according to the methods described herein. In some examples, aspects of the operations of 1305 may be performed by a request message component as described with reference to FIGS. 4 through 7.

At 1310, the UE may monitor a physical downlink control channel for a response message to the request message, the response message including a random access preamble index associated with the request message. The operations of 1310 may be performed according to the methods described herein. In some examples, aspects of the operations of 1310 may be performed by a monitoring component as described with reference to FIGS. 4 through 7.

At 1315, the UE may determine the RNTI based on the random access preamble index. The operations of 1315 may be performed according to the methods described herein. In some examples, aspects of the operations of 1315 may be performed by a RNTI component as described with reference to FIGS. 4 through 7.

At 1320, the UE may receive the response message on the physical downlink control channel. The operations of 1320 may be performed according to the methods described herein. In some examples, aspects of the operations of 1320 may be performed by a response message component as described with reference to FIGS. 4 through 7.

At 1325, the UE may unscramble a CRC of the response message with the RNTI. The operations of 1325 may be performed according to the methods described herein. In some examples, aspects of the operations of 1325 may be performed by a RNTI component as described with reference to FIGS. 4 through 7.

Figure 14:
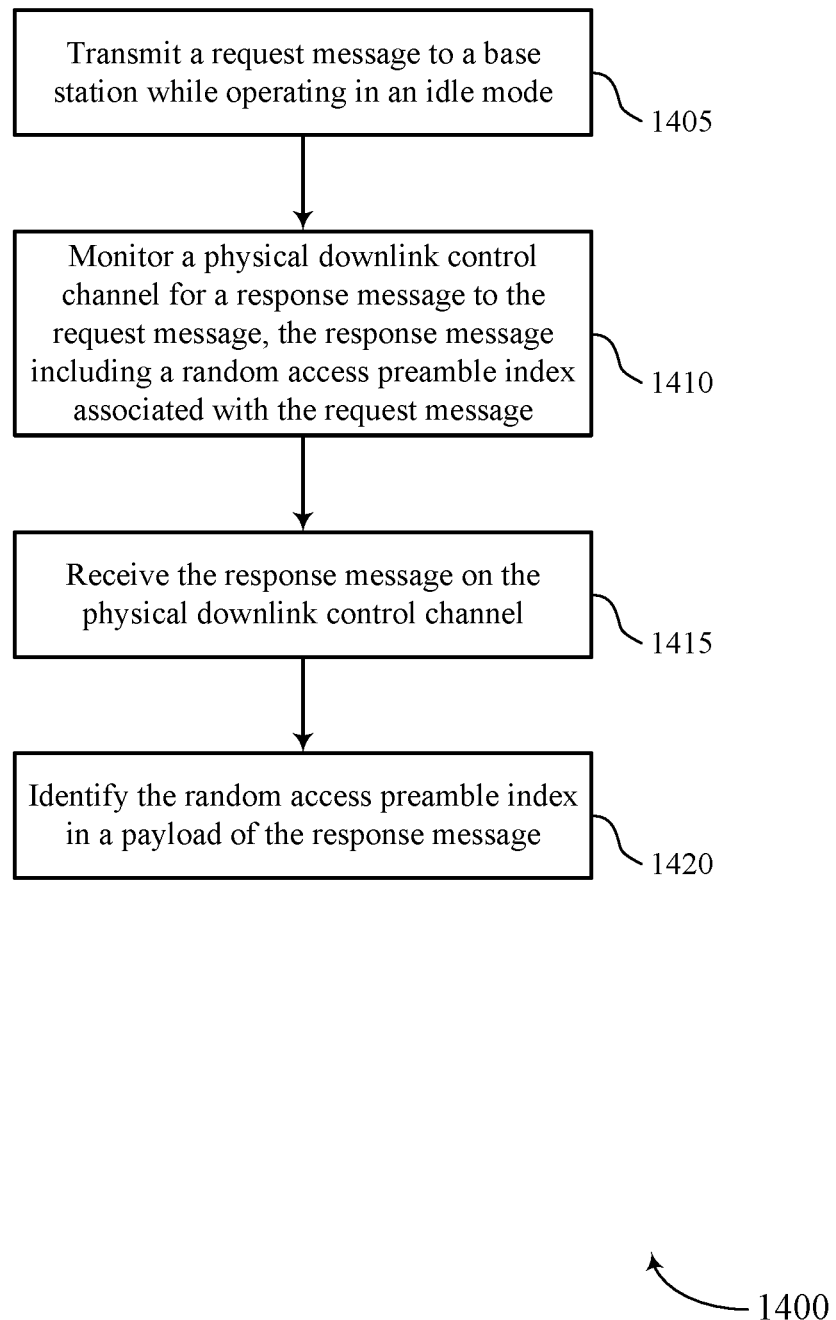

FIG. 14 shows a flowchart illustrating a method 1400 in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1405, the UE may transmit a request message to a base station while operating in an idle mode. The operations of 1405 may be performed according to the methods described herein. In some examples, aspects of the operations of 1405 may be performed by a request message component as described with reference to FIGS. 4 through 7.

At 1410, the UE may monitor a physical downlink control channel for a response message to the request message, the response message including a random access preamble index associated with the request message. The operations of 1410 may be performed according to the methods described herein. In some examples, aspects of the operations of 1410 may be performed by a monitoring component as described with reference to FIGS. 4 through 7.

At 1415, the UE may receive the response message on the physical downlink control channel. The operations of 1415 may be performed according to the methods described herein. In some examples, aspects of the operations of 1415 may be performed by a response message component as described with reference to FIGS. 4 through 7.

At 1420, the UE may identify the random access preamble index in a payload of the response message. The operations of 1420 may be performed according to the methods described herein. In some examples, aspects of the operations of 1420 may be performed by a payload identifying component as described with reference to FIGS. 4 through 7.

Figure 15:
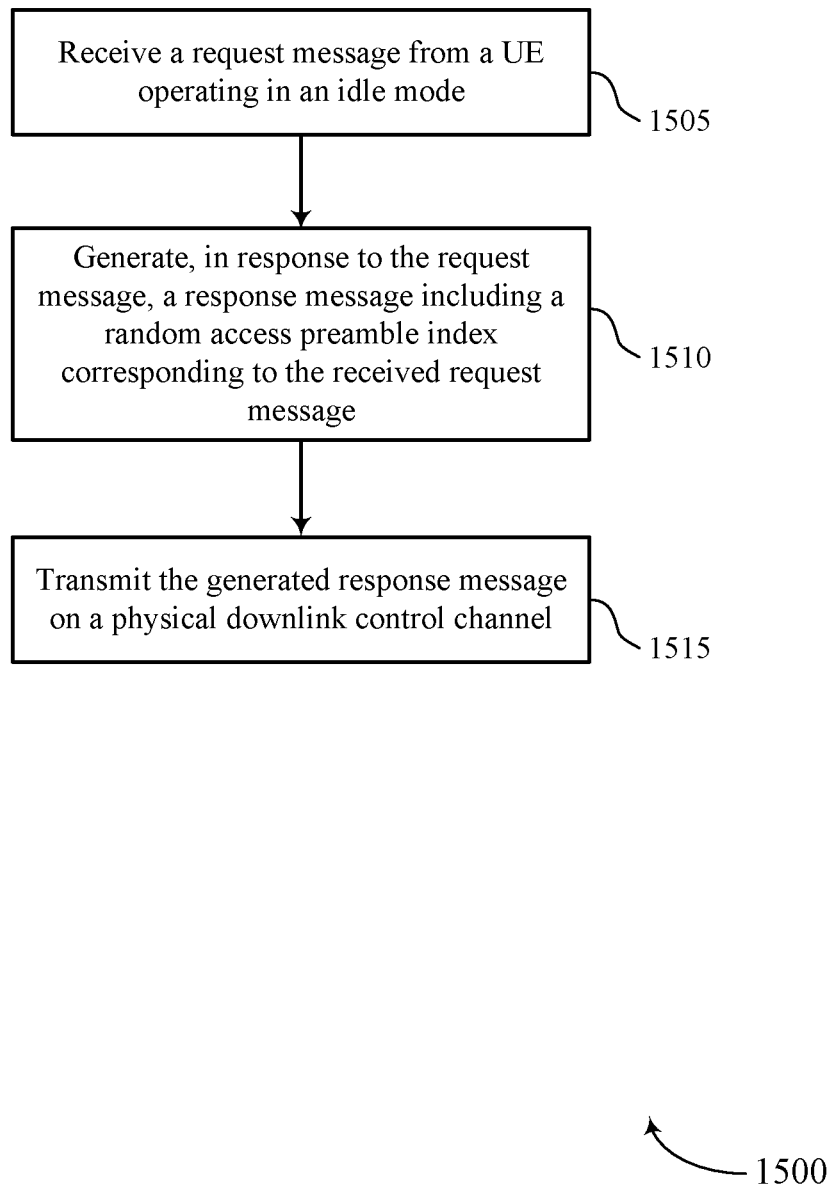

FIG. 15 shows a flowchart illustrating a method 1500 in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1505, the base station may receive a request message from a UE operating in an idle mode. The operations of 1505 may be performed according to the methods described herein. In some examples, aspects of the operations of 1505 may be performed by a request message component as described with reference to FIGS. 8 through 11.

At 1510, the base station may generate, in response to the request message, a response message including a random access preamble index corresponding to the received request message. The operations of 1510 may be performed according to the methods described herein. In some examples, aspects of the operations of 1510 may be performed by a response message generating component as described with reference to FIGS. 8 through 11.

At 1515, the base station may transmit the generated response message on a physical downlink control channel. The operations of 1515 may be performed according to the methods described herein. In some examples, aspects of the operations of 1515 may be performed by a response message transmitting component as described with reference to FIGS. 8 through 11.

Figure 16:
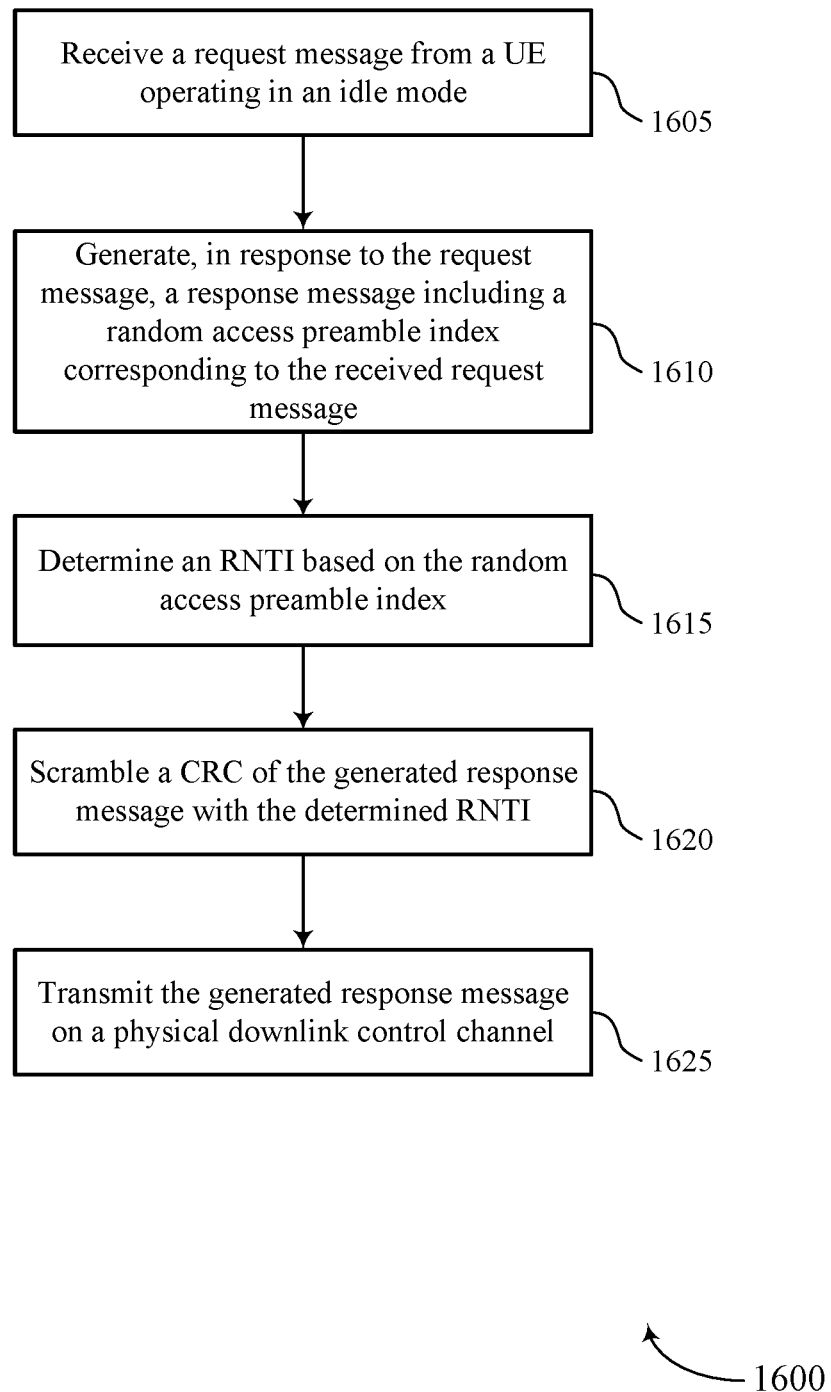

FIG. 16 shows a flowchart illustrating a method 1600 in accordance with aspects of the present disclosure. The operations of method 1600 may be implemented by a base station 105 or its components as described herein. For example, the operations of method 1600 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1605, the base station may receive a request message from a UE operating in an idle mode. The operations of 1605 may be performed according to the methods described herein. In some examples, aspects of the operations of 1605 may be performed by a request message component as described with reference to FIGS. 8 through 11.

At 1610, the base station may generate, in response to the request message, a response message including a random access preamble index corresponding to the received request message. The operations of 1615 may be performed according to the methods described herein. In some examples, aspects of the operations of 1615 may be performed by a response message generating component as described with reference to FIGS. 8 through 11.

At 1615, the base station may determine the RNTI based on the random access preamble index. The operations of 1610 may be performed according to the methods described herein. In some examples, aspects of the operations of 1610 may be performed by a RNTI component as described with reference to FIGS. 8 through 11.

At 1620, the base station may scramble a CRC of the generated response message with the determined RNTI. The operations of 1620 may be performed according to the methods described herein. In some examples, aspects of the operations of 1620 may be performed by a RNTI component as described with reference to FIGS. 8 through 11.

At 1625, the base station may transmit the generated response message on a physical downlink control channel. The operations of 1625 may be performed according to the methods described herein. In some examples, aspects of the operations of 1625 may be performed by a response message transmitting component as described with reference to FIGS. 8 through 11.

Figure 17:
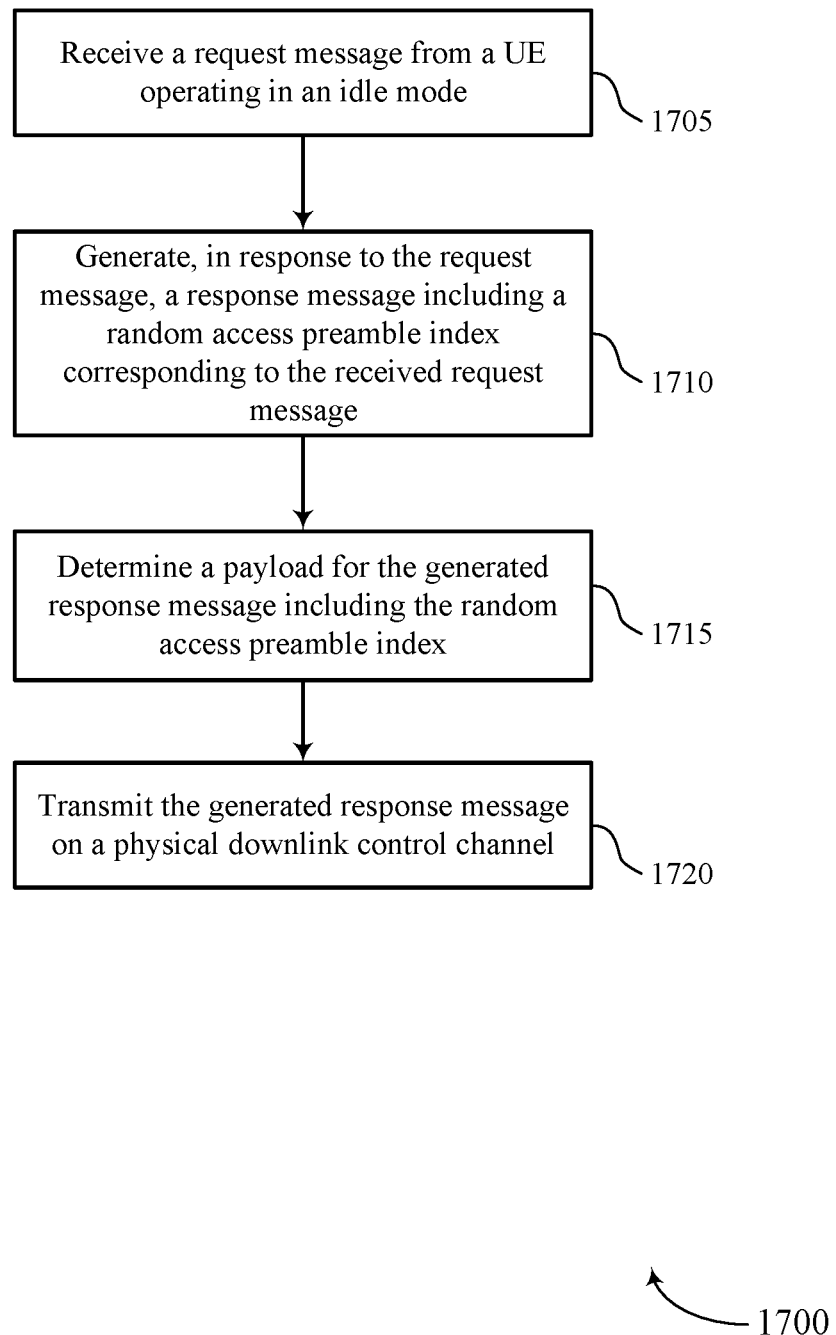

FIG. 17 shows a flowchart illustrating a method 1700 in accordance with aspects of the present disclosure. The operations of method 1700 may be implemented by a base station 105 or its components as described herein. For example, the operations of method 1700 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1705, the base station may receive a request message from a UE operating in an idle mode. The operations of 1705 may be performed according to the methods described herein. In some examples, aspects of the operations of 1705 may be performed by a request message component as described with reference to FIGS. 8 through 11.

At 1710, the base station may generate, in response to the request message, a response message including a random access preamble index corresponding to the received request message. The operations of 1715 may be performed according to the methods described herein. In some examples, aspects of the operations of 1715 may be performed by a response message generating component as described with reference to FIGS. 8 through 11.

At 1715, the base station may determine a payload for the generated response message including the random access preamble index. The operations of 1710 may be performed according to the methods described herein. In some examples, aspects of the operations of 1710 may be performed by a payload component as described with reference to FIGS. 8 through 11.

At 1720, the base station may transmit the generated response message on a physical downlink control channel. The operations of 1720 may be performed according to the methods described herein. In some examples, aspects of the operations of 1720 may be performed by a response message transmitting component as described with reference to FIGS. 8 through 11.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856

(TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, at a user equipment (UE), comprising:
    transmitting a request message to a network device while operating in a power conserving mode;
    monitoring a physical downlink control channel for a response message to the request message, the response message comprising a random access preamble index associated with the request message; and
    receiving the response message on the physical downlink control channel.

2. The method of claim 1, further comprising:
    determining a radio network temporary identifier (RNTI) based at least in part on the random access preamble index; and
    unscrambling a cyclic redundancy check (CRC) of the response message with the RNTI.

3. The method of claim 1, further comprising:
    identifying a bit field pattern indicating a radio network temporary identifier (RNTI) for the response message is calculated based at least in part on the random access preamble index.

4. The method of claim 1, further comprising:
    identifying a first subset of bits of the random access preamble index in a radio network temporary identifier (RNTI); and
    identifying a second subset of bits of the random access preamble index in a payload of the response message.

5. The method of claim 1, further comprising:
    identifying the random access preamble index in a payload of the response message.

6. The method of claim 1, further comprising:
    identifying a payload of the response message based at least in part on a value of a frequency assignment bit field of the response message.

7. The method of claim 6, wherein the payload is further identified based at least in part on one or more reserved bits of the response message.

8. The method of claim 1, wherein the response message is an acknowledgment of the request message.

9. The method of claim 1, wherein the response message comprises information in response to the request message.

10. The method of claim 9, wherein the request message is a system information request and the information in response to the request message comprises timing or frequency information related to when a requested system information will be transmitted.

11. The method of claim 9, wherein the request message is a positioning reference signal (PRS) request, and the information in response to the request message comprises a configuration for a PRS to be transmitted in response to the PRS request.

12. The method of claim 1, wherein the response message comprises a single random access response.

13. The method of claim 1, wherein a type of the response message is indicated by a type-identifying field in a radio network temporary identifier (RNTI).

14. A method, at a network device, for wireless communications, comprising:
    receiving a request message from a user equipment (UE) operating in a power conserving mode;
    generating, in response to the request message, a response message comprising a random access preamble index corresponding to the request message; and
    transmitting the generated response message on a physical downlink control channel.

15. The method of claim 14, further comprising:
    determining a radio network temporary identifier (RNTI) based at least in part on the random access preamble index; and
    scrambling a cyclic redundancy check (CRC) of the generated response message with the determined RNTI.

16. The method of claim 14, further comprising:
    setting a bit field pattern of the generated response message indicating a radio network temporary identifier (RNTI) is calculated based at least in part on the random access preamble index.

17. The method of claim 14, further comprising:
    including a first subset of bits of the random access preamble index in a radio network temporary identifier (RNTI); and
    including a second subset of bits of the random access preamble index in a payload of the generated response message.

18. The method of claim 14, further comprising:
    determining a payload for the generated response message comprising the random access preamble index.

19. The method of claim 14, further comprising:
    indicating a payload for the generated response message comprises the random access preamble index based at least in part on a value of a frequency assignment bit field.

20. The method of claim 19, wherein:
    indicating the payload comprises the random access preamble index is further based at least in part on one or more reserved bits of the generated response message.

21. The method of claim 14, wherein the generated response message is an acknowledgment of the request message.

22. The method of claim 14, wherein the generated response message includes information in response to the request message.

23. The method of claim 22, wherein the request message is a system information request and the information in response to the request message comprises timing or frequency information related to when a requested system information will be transmitted.

24. The method of claim 22, wherein the request message is a positioning reference signal (PRS) request, and the information in response to the request message comprises a configuration for a PRS to be transmitted in response to the PRS request.

25. The method of claim 14, further comprising:
identifying a single random access response for the generated response message, wherein the generated response message is transmitted on the physical downlink control channel based at least in part on the identifying.

26. The method of claim 14, wherein a type of the generated response message is indicated by a type-identifying field in a radio network temporary identifier (RNTI).

27. A user equipment (UE) for wireless communications, comprising:
a processor,
memory in electronic communication with the processor; and
instructions stored in the memory and executable by the processor to cause the UE to:
transmit a request message to a network device while operating in a power conserving mode;
monitor a physical downlink control channel for a response message to the request message, the response message comprising a random access preamble index associated with the request message; and
receive the response message on the physical downlink control channel.

28. The UE of claim 27, wherein the instructions are further executable by the processor to cause the UE to:
determine a radio network temporary identifier (RNTI) based at least in part on the random access preamble index; and
unscramble a cyclic redundancy check (CRC) of the response message with the RNTI.

29. A network device for wireless communications, comprising:
a processor,
memory in electronic communication with the processor; and
instructions stored in the memory and executable by the processor to cause the network device to:
receive a request message from a user equipment (UE) operating in a power conserving mode;
generate, in response to the request message, a response message comprising a random access preamble index corresponding to the request message; and
transmit the generated response message on a physical downlink control channel.

30. The network device of claim 29, wherein the instructions are further executable by the processor to cause the network device to:
determine a radio network temporary identifier (RNTI) based at least in part on the random access preamble index; and
scramble a cyclic redundancy check (CRC) of the generated response message with the determined RNTI.

* * * * *